(12) United States Patent
Sato

(10) Patent No.: US 8,949,238 B2
(45) Date of Patent: Feb. 3, 2015

(54) INFORMATION PROCESSING DEVICE, METHOD, AND COMPUTER PROGRAM PRODUCT

(75) Inventor: Tatsuhito Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 220 days.

(21) Appl. No.: 13/467,100

(22) Filed: May 9, 2012

(65) Prior Publication Data

US 2012/0317114 A1 Dec. 13, 2012

(30) Foreign Application Priority Data

Jun. 8, 2011 (JP) ................. 2011-128359

(51) Int. Cl.
G06F 17/30 (2006.01)
G06Q 30/02 (2012.01)
G06Q 90/00 (2006.01)

(52) U.S. Cl.
CPC ............ *G06Q 30/0201* (2013.01); *G06Q 90/00* (2013.01)
USPC ........................................................ 707/737

(58) Field of Classification Search
None
See application file for complete search history.

(56) References Cited

U.S. PATENT DOCUMENTS

| 2005/0076056 | A1* | 4/2005 | Paalasmaa et al. | 707/104.1 |
| 2006/0045350 | A1* | 3/2006 | Itoh et al. | 382/209 |
| 2006/0215038 | A1* | 9/2006 | Gruber et al. | 348/218.1 |
| 2011/0123120 | A1* | 5/2011 | Quack | 382/197 |
| 2012/0233531 | A1* | 9/2012 | Ma et al. | 715/205 |

FOREIGN PATENT DOCUMENTS

| JP | 2008-250605 | 10/2008 |
| JP | 4577173 | 9/2010 |

* cited by examiner

*Primary Examiner* — Bai D. Vu
(74) *Attorney, Agent, or Firm* — Oblon, Spivak, McClelland, Maier & Neustadt, L.L.P.

(57) ABSTRACT

An information processing device, method and computer program product use a candidate attribute area identification portion configured to receive information associated with a cluster including at least one data item. The candidate attribute area identification portion identifies at least one named attribute area for each of the at least one data item. A relatedness assessment portion assesses a relatedness between the cluster and each of the at least one named attribute area. A cluster name generation portion generates a cluster name based on the assessed relatedness, wherein said cluster name includes at least a part of one of the at least one named attribute area.

12 Claims, 20 Drawing Sheets

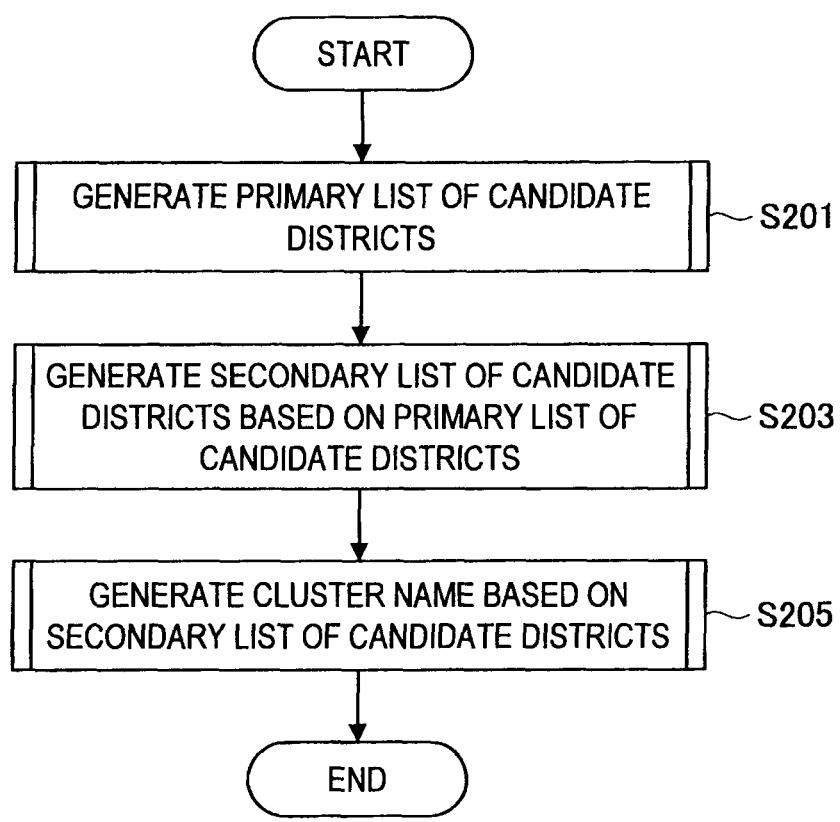

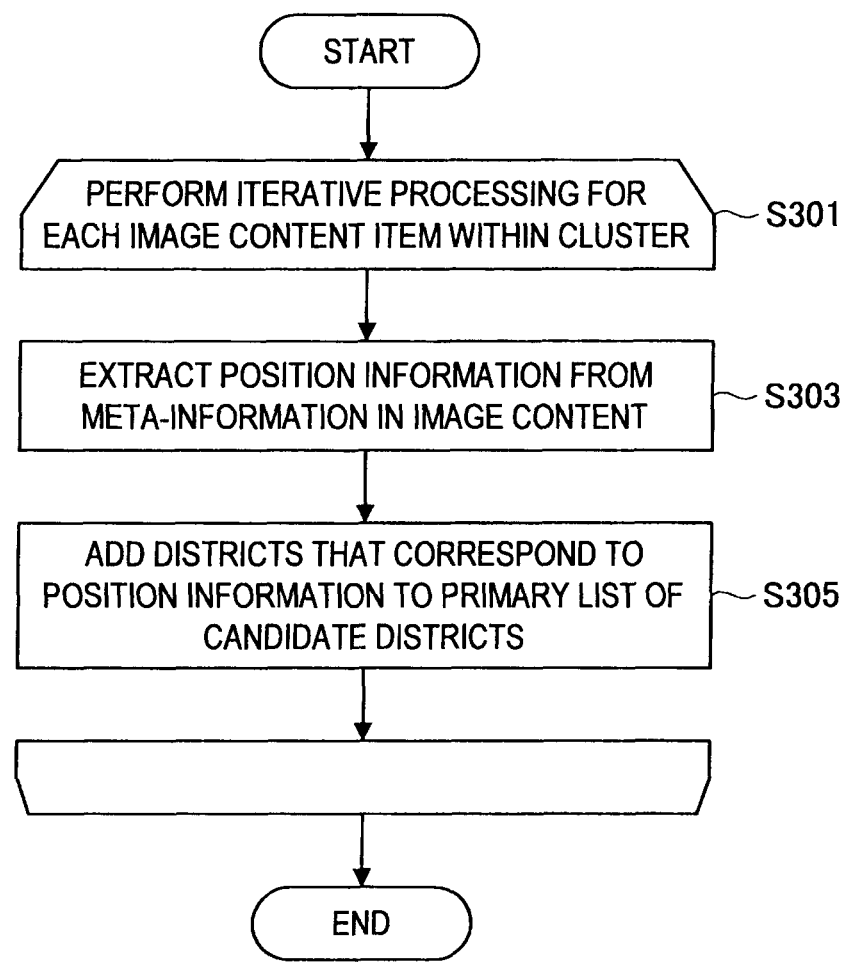

| ID | DISTRICT NAME | DISTRICT DATA | DISTRICT AREA |
|---|---|---|---|
| 20 | CHINATOWN | $\begin{bmatrix} 0 & 0 \\ 0 & 1 \end{bmatrix}$ | 2.73 |
| 21 | DOGASHIMA | $\begin{bmatrix} 0 & 0 \\ 0 & 1 \end{bmatrix}$ | 30.80 |
| 22 | CHIBA NEW TOWN CENTRAL STATION AND VICINITY | $\begin{bmatrix} 0 & 0 \\ 0 & 1 \end{bmatrix}$ | 1.13 |
| 23 | MOUNT FUJI | $\begin{bmatrix} 0 & 0 \\ 0 & 1 \end{bmatrix}$ | 670.33 |
| 24 | INZAI MAKINOHARA STATION AND VICINITY | $\begin{bmatrix} 0 & 0 \\ 0 & 1 \end{bmatrix}$ | 0.51 |
| 25 | KAIHIN MAKUHARI STATION AND VICINITY | $\begin{bmatrix} 0 & 0 \\ 0 & 1 \end{bmatrix}$ | 0.50 |
| 26 | MAKUHARI MESSE | $\begin{bmatrix} 0 & 0 \\ 0 & 1 \end{bmatrix}$ | 1.67 |
| ⋮ | ⋮ | ⋮ | ⋮ |
| 28 | KANTO REGION | $\begin{bmatrix} 0 & 0 \\ 0 & 1 \end{bmatrix}$ | 32423.90 |
| ⋮ | ⋮ | ⋮ | ⋮ |
| 30 | METROPOLITAN TOKYO | $\begin{bmatrix} 0 & 0 \\ 0 & 1 \end{bmatrix}$ | 2187.65 |
| ⋮ | ⋮ | ⋮ | ⋮ |
| 32 | SHINAGAWA WARD | $\begin{bmatrix} 0 & 0 \\ 0 & 1 \end{bmatrix}$ | 22.72 |

140

| DISTRICT NAME | DISTRICT AREA S | CONTENT ITEM ID | NUMBER n OF CONTENT ITEMS | AREA D OF OVERLAP WITH CLUSTER DISTRICT |
|---|---|---|---|---|
| A | 50 | 1,2,3,4,5 | 5 | 15 |
| B | 55 | 1,3 | 2 | 7 |
| C | 50 | 2,3,4,5,6 | 5 | 14 |

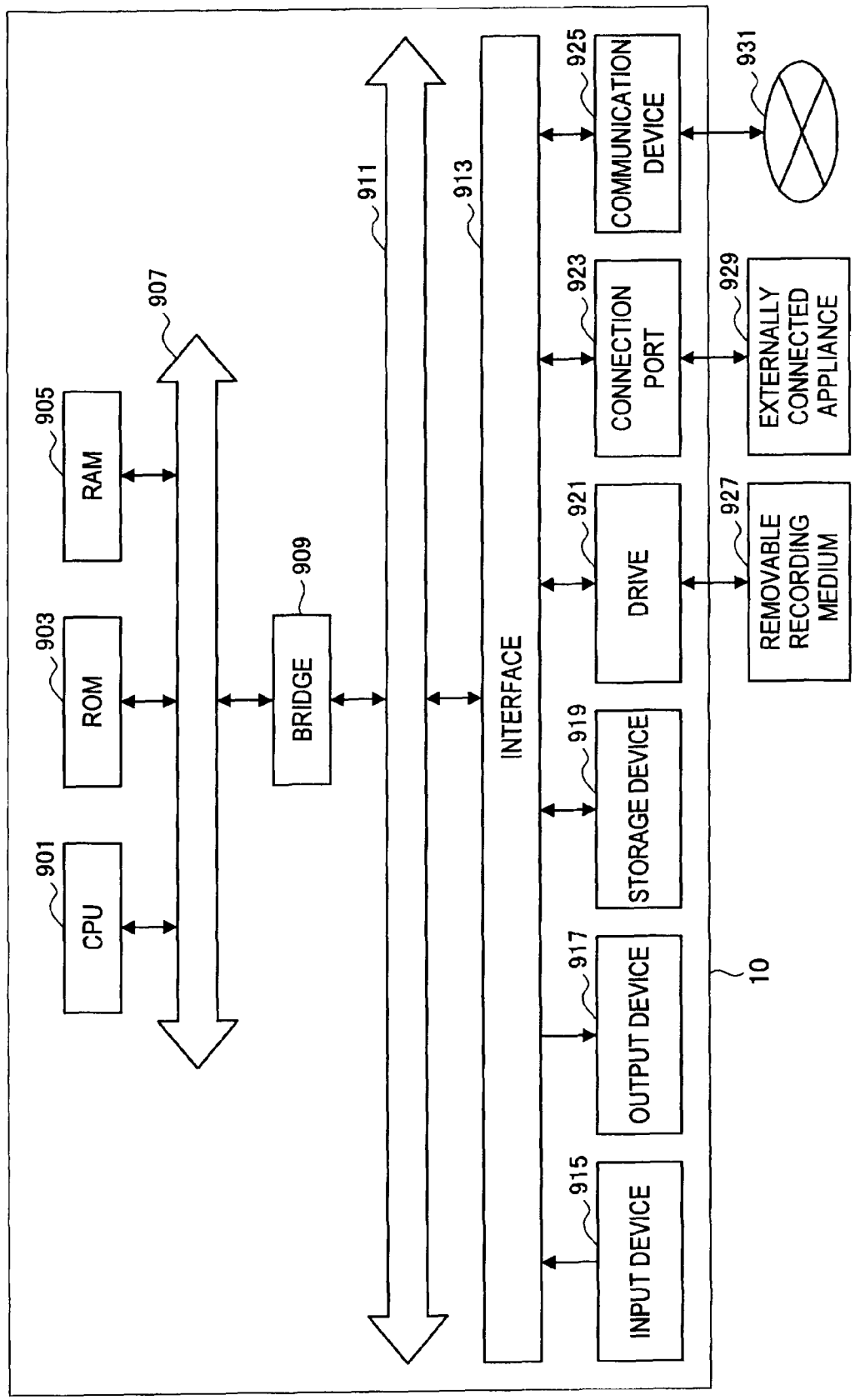

INFORMATION PROCESSING DEVICE, METHOD, AND COMPUTER PROGRAM PRODUCT

BACKGROUND

The present disclosure relates to an information processing device, information processing method, and computer program product.

Clustering is known as a method for grouping data that include position information. As an example of clustering, a technology is disclosed in Japanese Patent Application Publication No. JP-A 2008-250605 that groups photographs that have been captured in positions that are close to one another into the same cluster, based on information about the positions where the photographs were captured. In addition, a technology is disclosed in Japanese Patent Application Publication No. JP-A 4577173 that groups photographs that have been captured at times that are close to one another into the same cluster, based on information about the times when the photographs were captured.

A technology has also been developed that assigns a name to a cluster that has been produced as a result of clustering, using a name of a specified district, such that a name of a location that includes the positions where the photographs that have been grouped into the cluster were captured is assigned as the cluster name.

SUMMARY

However, the name that is assigned to the cluster by the technology that is described above is not necessarily such a natural name that a user will feel it is appropriate. For example, in the case of a cluster into which the photographs have been grouped based on the positions where they were captured, if the photographs that have been grouped into the cluster were captured in positions that are close to one another, but that straddle a boundary between locations, the name that is assigned to the cluster may be a name of a location that is unnaturally large in relation to the district that is represented by the cluster.

An exemplary information processing device, method and computer program product use a candidate attribute area identification portion configured to receive information associated with a cluster including at least one data item. The candidate attribute area identification portion identifies at least one named attribute area for each of the at least one data item. A relatedness assessment portion assesses a relatedness between the cluster and each of the at least one named attribute area. A cluster name generation portion generates a cluster name based on the assessed relatedness, wherein said cluster name includes at least a part of one of the at least one named attribute area.

BRIEF DESCRIPTION OF THE DRAWINGS

FIG. 6 is a flowchart that shows an overview of cluster name generation processing in the first embodiment of the present disclosure;

FIG. 7 is a flowchart that shows processing in a candidate district identification portion in the first embodiment of the present disclosure;

FIG. 8 is a figure that shows an example of a location list that is stored in a district name database in the first embodiment of the present disclosure;

FIG. 21 is a block diagram for explaining a hardware configuration of an information processing device according to an embodiment of the present disclosure.

DETAILED DESCRIPTION

Figure 1:
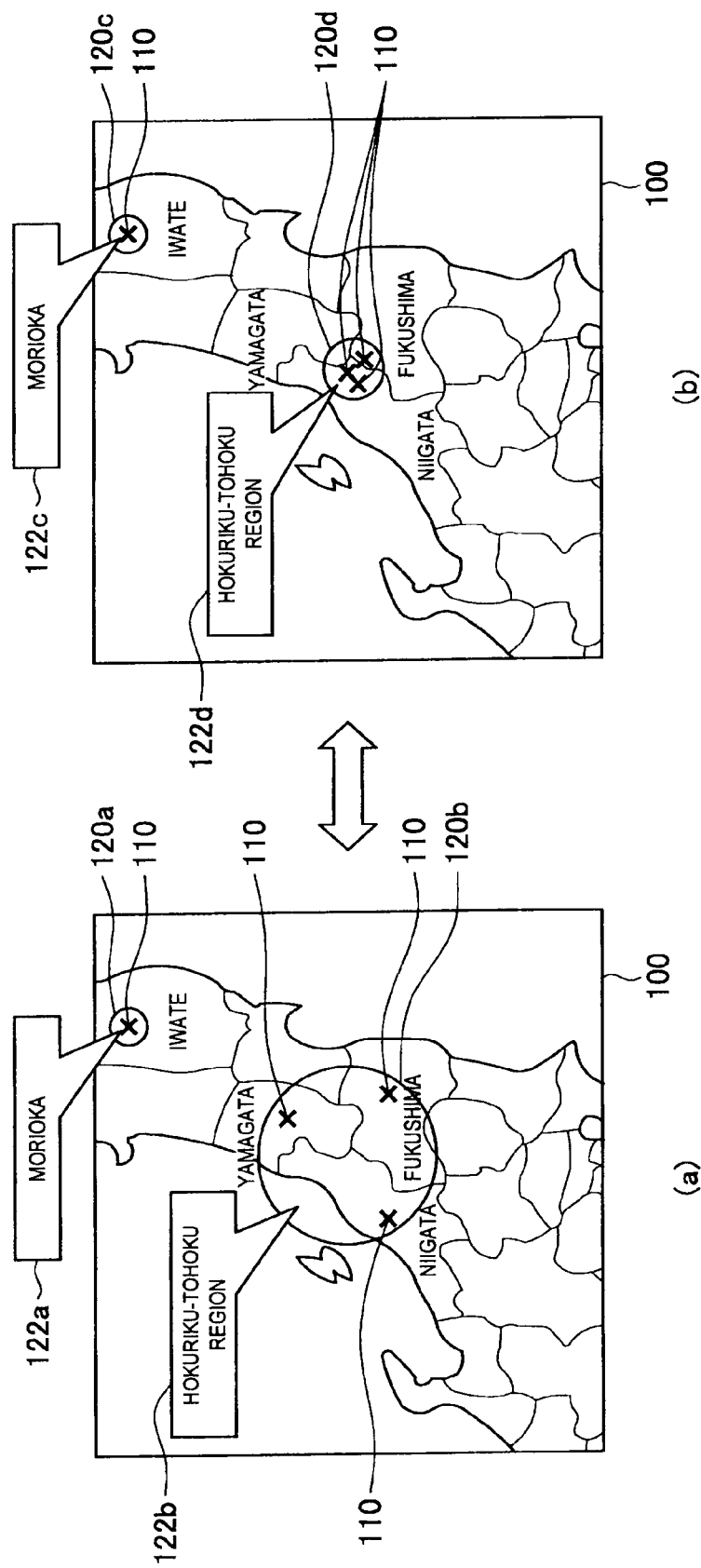
FIG. 1 is a figure that shows an example of cluster name generation by another method.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the embodiments will be explained in the order shown below.

1. First Embodiment
1-1. Overview
1-2. Device configuration
1-3. Candidate district (or attribute area) identification portion 1-4. Relatedness assessment portion
1-5. Cluster name generation portion
2. Second Embodiment
3. Third Embodiment
4. Fourth Embodiment
5. Hardware configuration
6. Supplement 1. First Embodiment 1-1. Overview First, an overview of a first embodiment of the present disclosure will be explained with reference to FIGS. 1 and 2. Here, in order to provide an overall understanding of cluster name generation that is implemented by the present embodiment, an example of the cluster name generation by the present embodiment will be explained in contrast to an example of cluster name generation by another method. The example of the cluster name generation by the other method is shown in FIG. 1, and the example of the cluster name generation by the present embodiment is shown in FIG. 2.

Figure 2:
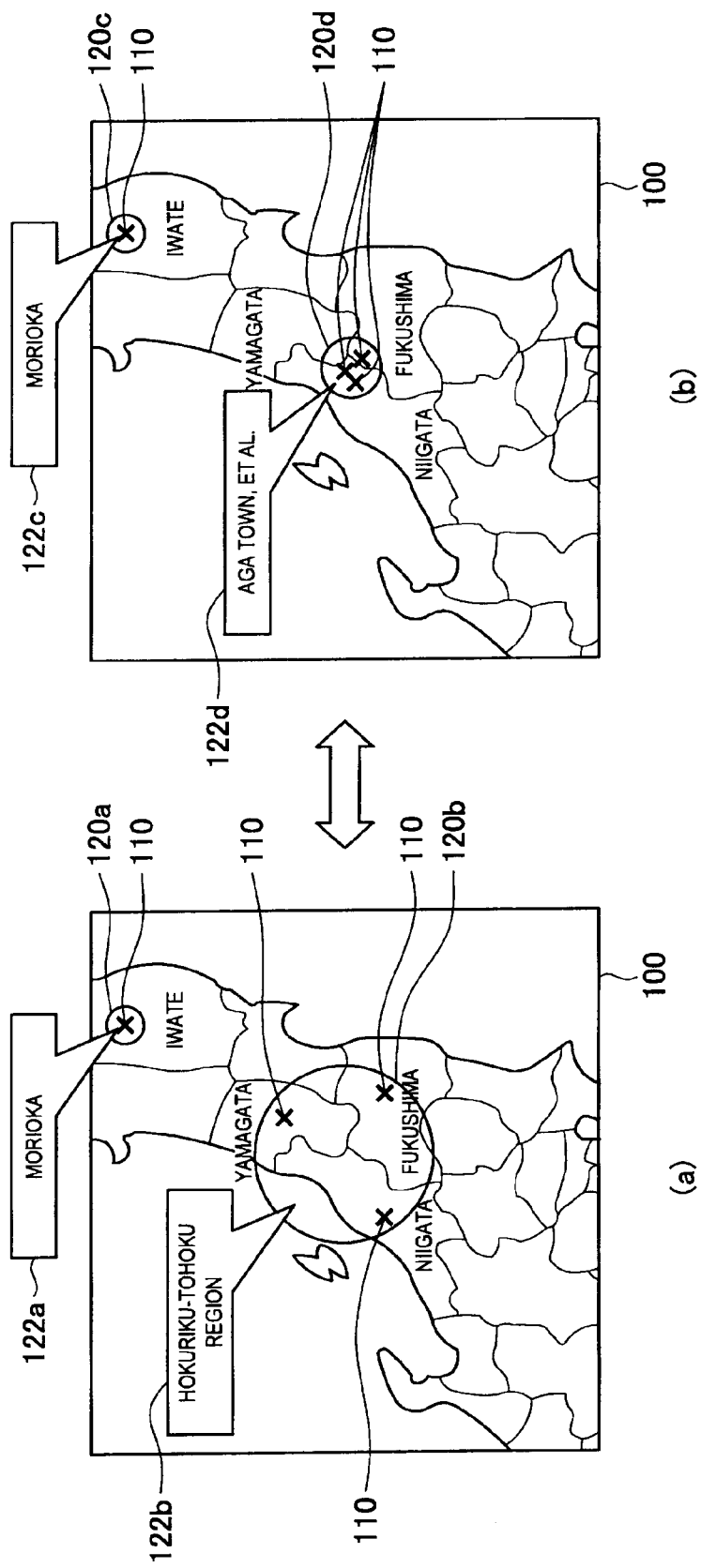
FIG. 2 is a figure that shows an example of the cluster name generation according to a first embodiment of the present disclosure.

The example of the cluster name generation by the other method that is shown in FIG. 1 will be explained first. Image content 110 is image content that has been captured by a device that has an image capture function, such as a digital camera, a mobile telephone, or the like. Information on the image capture position is appended to the image content 110 as meta-information. The image content 110 is indicated on a map 100 according to its image capture position. The image content 110 is also grouped into a cluster 120 based on the image capture position. A cluster name 122 that is generated using a predetermined name as the name of a location on the map 100 is assigned to the cluster 120.

Here, the location names on the map 100 are defined for municipalities, prefectures, and regions. Each of the municipalities is associated with a prefecture, and each of the prefectures is associated with a region. En other words, the relationships among the municipalities, prefectures, and regions are defined by a tree structure, with relationships between higher ranking and lower ranking elements. In the example in FIG. 1, in a case where a plurality of items of the image content 110 that are distributed over a plurality of locations are included in the cluster 120, the name of a higher ranking location that is common to all of the locations is assigned as the cluster name 122.

An example in which a plurality of items of the image content 110 are grouped into a cluster 120a and a cluster 120b is shown in part (a) of FIG. 1. One item of the image content 110 that is positioned in Morioka is included in the cluster 120a, so "Morioka" is assigned as a cluster name 122a. Three items of the image content 110 that are positioned in Niigata Prefecture, Fukushima Prefecture, and Yamagata Prefecture are included in the cluster 120b, so "Hokuriku-Tohoku region", which is a higher ranking location name that is common to the three prefectures, is assigned as a cluster name 122b. Of course, in the US, a location, town, city, county, state ranking more likely be applicable.

In contrast, an example in which a plurality of items of the image content 110 are grouped into a cluster 120c and a cluster 120d is shown in part (b) of FIG. 1. One item of the image content 110 that is positioned in Morioka is included in the cluster 120c, in the same manner as it was included in the cluster 120a, and "Morioka" is assigned as a cluster name 122c. Three items of the image content 110 that are positioned in Niigata Prefecture and Fukushima Prefecture are included in the cluster 120d, so "Hokuriku-Tohoku region", which is a higher ranking location name that is common to the two prefectures, is assigned as a cluster name 122d.

Here, the clusters 120a, 120c are clusters with approximately the same size as a district for a municipality. Therefore, the cluster names 122a, 122c, which use the municipality name "Morioka" are considered to be natural names. The cluster 120b is a cluster with a size that is larger than a district for an average prefecture. Therefore, the cluster name 122b, which uses the region name "Hokuriku-Tohoku region", is considered to be a natural name.

However, the cluster 120d is assigned the cluster name 122d, which also uses the region name "Hokuriku-Tohoku region", the same as the much larger cluster 120b, even though the cluster 120d is approximately the same size as a district for a municipality. The assigned cluster name 122d does not fit the size of the cluster 120d, so it can impress a user as being more unnatural than the other cluster names 122a to 122c.

When a higher ranking location name that is common to a plurality of locations is assigned as the cluster name 122 for a cluster 120 in which are grouped a plurality of items of the image content 110 that are positioned in a plurality of locations, there is a possibility that a cluster name 122 that impresses the user as unnatural will be assigned, as in the example of the cluster 120d, where the size of the cluster 120 does not match the district that is indicated by the cluster name 122.

Next an example of the present embodiment that is shown in FIG. 2 will be explained. An example is shown in part (a) of FIG. 2 in which the image content 110 is the same as in part (a) of FIG. 1 and the cluster names 122a, 122b are assigned to the clusters 120a, 120b in the same manner as in the example in FIG. 1. In part (b) of FIG. 2, an example is shown in which the image content 110 and the clusters 120c, 120d are the same as in part (b) of FIG. 1, and the cluster name 122c is the same as in the example in FIG. 1, but the cluster name 122d is "Aga town, et al." instead of "Hokuriku-Tohoku region".

Even in the example in FIG. 2, the cluster names 122 are generated using the location names on the map 100, in the same manner as in the example in FIG. 1. For example, for the cluster 120b, "Hokuriku-Tohoku region", which is the higher ranking location name that is common to the plurality of the prefectures where the items of the image content 110 are located, is assigned as the cluster name 122b in the same manner as in the example in FIG. 1. On the other hand, for the cluster 120d, for example, the cluster name 122d that is assigned is different from the one in the example in FIG. 1. This is because, in the example in FIG. 2, a determination is made as to whether or not it is appropriate to assign a higher ranking location name. In a case where it is determined that it is not appropriate to assign a higher ranking location name, the cluster name 122 can be generated using a lower ranking location name, even in a case where a plurality of items of the image content 110 that are distributed over a plurality of locations are included in the cluster 120.

This will be explained in greater detail using the cluster 120d as an example. In the generating of the cluster name 122d for the cluster 120d, a determination is made as to which one of the municipality name "Aga town" (a town in Niigata Prefecture), the prefecture names "Niigata Prefecture" and "Fukushima Prefecture", which are higher ranking locations, and the region name "Hokuriku-Tohoku region", which is an even higher ranking location, most precisely describes the district of the cluster 120d. In the example that is shown in the drawings, a determination is made that the most precise name is "Aga town", which is the name of the municipality that includes the image capture positions for two of the three image content 110 items that are included in the cluster 120d, so "Aga town" is used for the cluster name 122d. An image content 110 item whose image capture position is not included in the district for Aga town is also included in the cluster 120d, so "et al." is added to the cluster name 122d.

As described above, the cluster 120d is a cluster with approximately the same size as a municipality district. The cluster name 122d, "Aga town, et al." that is assigned in the example in FIG. 2 is generated using the name "Aga town" of a municipality that is a location whose size matches the size of the cluster 120d, so it is thought to be a name that will impress the user as being more natural.

In the present embodiment, the generating of the cluster name 122 like that in the example in FIG. 2 that is explained above is implemented. Hereinafter, the configuration for that purpose, and a more detailed example of the cluster name generation, will be explained.

1-2. Device Configuration

Figure 3:
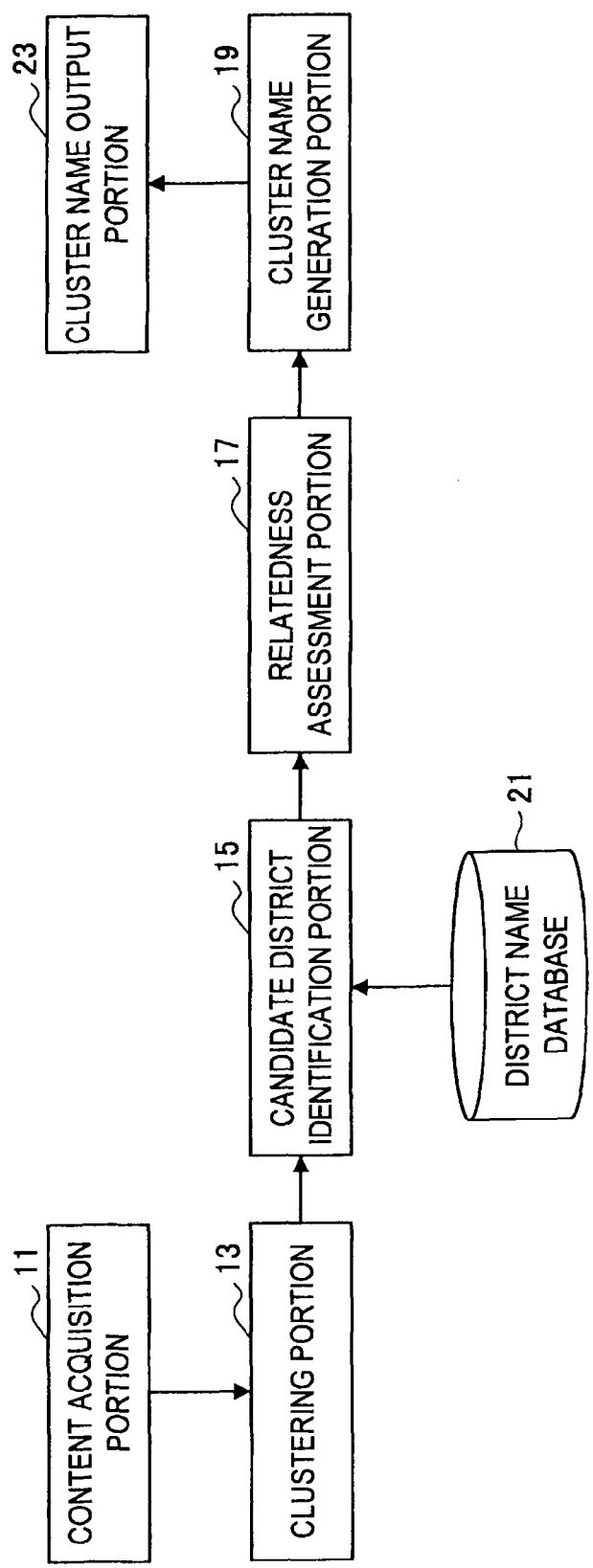
FIG. 3 is a block diagram that schematically shows a functional configuration of an information processing device according to the first embodiment of the present disclosure.

A functional configuration of an information processing device 10 according to the first embodiment of the present disclosure will be explained with reference to FIG. 3. The block diagram in FIG. 3 schematically shows the functional configuration of the information processing device 10 according to the first embodiment of the present disclosure. The information processing device 10 may be implemented in the form of a personal computer (PC), for example, and includes a content acquisition portion 11, a clustering portion 13, a candidate district (or attribute area) identification portion 15, a relatedness assessment portion 17, a cluster name generation portion 19, a district name database 21, and a cluster name output portion 23.

The content acquisition portion 11 acquires information about the image content 110. The image content 110 may be, for example, image content that has been captured by a device that has an image capture function, such as a digital camera, a mobile telephone, or the like, and information on the image capture position is appended to the image content 110 as the meta-information. The content acquisition portion 11 can be implemented in the form of a connection port, a communication device, or the like that communicates with the devices that capture the image content 110. Note that the content acquisition portion 11 does not have to acquire the entirety of the image content 110, including the image data, and, for example, may acquire only an ID that specifies the content and the meta-information on the image capture position.

The clustering portion 13 groups the image content 110 that has been acquired by the content acquisition portion 11 into the clusters 120. The candidate district identification portion 15, the relatedness assessment portion 17, and the cluster name generation portion 19 generate the cluster names 122 that are assigned to the clusters 120. The functions of each of these portions will be described in detail later. The clustering portion 13, the candidate district identification portion 15, the relatedness assessment portion 17, and the cluster name generation portion 19 can be implemented by a central processing unit (CPU), a read only memory (ROM), a random access memory (RAM), and the like, for example.

The district name database 21 is a database that is referenced by the candidate district identification portion 15. The district name database 21 can be implemented by a storage device or the like that the information processing device 10 has, for example. The district name database 21 may also be implemented by a storage device that is external to the information processing device 10, and the information processing device 10 may reference it by using a communication device. The information that is stored in the district name database 21 will be described later.

The cluster name output portion 23 outputs information about the cluster names 122 that have been generated. For example, the information about the cluster names 122 may be output by taking information about the clusters 120 with which the cluster names 122 are associated and transmitting that information back to the other devices, such as the digital camera, the mobile telephone, and the like, that provided the information about the image content 110 to the information processing device 10. In that case, the cluster name output portion 23 can be implemented in the form of a connection port or a communication device that communicates with the other devices. The information about the cluster names 122 may also be output to the user from the information processing device 10, along with the information about the clusters 120. In that case, the cluster name output portion 23 can be implemented in the form of an output device such as a display or the like that the information processing device 10 has.

Note that various types of configurations that are not limited to the example that is described above make possible the acquiring of the image content 110 by the information processing device 10, the clustering that groups the image content 110 into the clusters 120, and the outputting of the cluster names 122. For example, the information processing device 10 may also have an image capture function and may capture the image content 110 on its own. The information processing device 10 may also acquire the result of the clustering by another device, and may perform only the generating of the cluster names 122. Therefore, the information processing device 10 can be not only a PC, but any type of information processing device, such as a digital camera, a video camera, a game device, a mobile telephone, a smart phone, a car navigation system, a personal digital assistant (PDA), or the like.

While the above configured was an exemplary PC-based configuration, the structure need not be limited to a single device. For example, the clustering portion 13, candidate district identification portion 15, relatedness assessment portion 17, and cluster name generation portion 19, may be performed in a remote device, such as a cloud computing server(s), that communicates with the content acquisition portion 11 and cluster name output portion 23 via a communication link, such as a wireless link, or wired Internet link.

Clustering Processing

Next, clustering processing by the information processing device 10 according to the present embodiment will be explained with reference to FIGS. 4 and 5.

Figure 4:
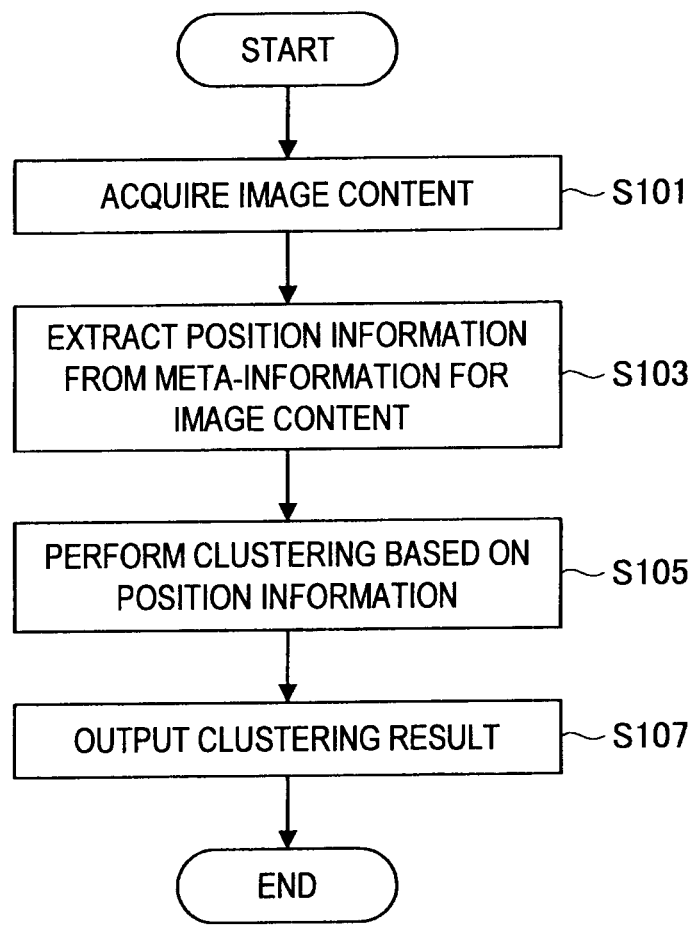
FIG. 4 is a flowchart that shows clustering processing in the first embodiment of the present disclosure.

FIG. 4 is a flowchart that shows the clustering processing in the present embodiment. First, the clustering portion 13 acquires the image content 110 that has been acquired by the content acquisition portion 11 (Step S101). Next, the clustering portion 13 extracts position information from the meta-information for the image content 110 (Step S103). In this case, the extracted position information is the information that was appended to the image content 110 as the information about the image capture position.

Next, the clustering portion 13 performs clustering based on the extracted position information (Step S105). The image content 110 is grouped into the clusters 120 by the clustering. In the clustering, a distance-based technique can be used in which the distances between the image content 110 items are computed based on the position information, for example, and the image content 110 items that are close to one another are grouped into the same cluster 120, but the clustering is not limited to this technique, and any sort of known technique can be used.

Next, the clustering portion 13 outputs the results of the clustering to the candidate district identification portion 15 (Step S107). The results that are output may be, for example, the results that are shown in FIG. 5.

Figure 5:
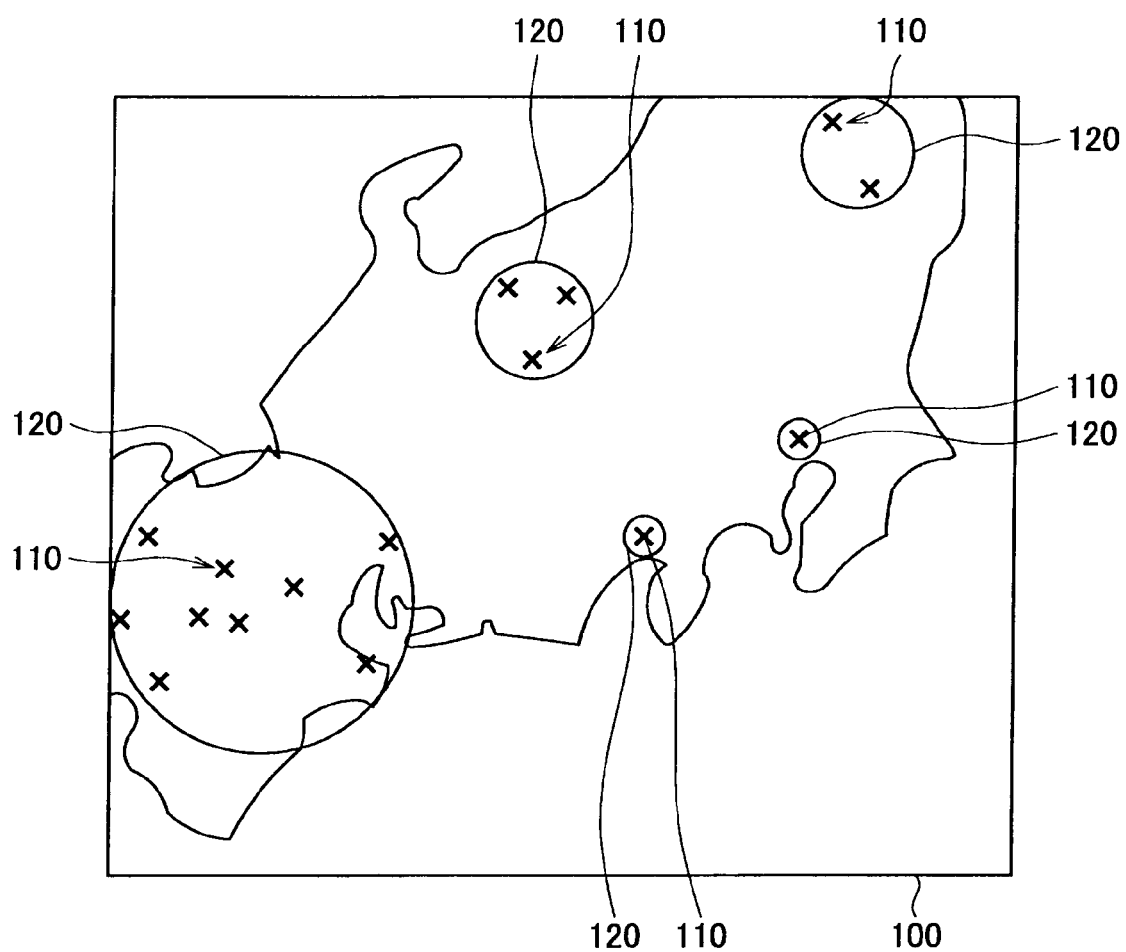
FIG. 5 is a figure that shows an example of clustering results in the first embodiment of the present disclosure.

FIG. 5 is a figure that shows an example of the clustering results in the present embodiment. The clustering results include the positions of the image content 110 items on the map 100 and information about the districts of the clusters 120 into which the image content 110 items have been grouped. In this specification, the information that is output from the clustering portion 13 is also called the cluster information. Note that the map 100 is a two-dimensional feature space, and the image content 110 items are data that are expressed as positions in the feature space. The clustering portion 13 is a cluster information acquisition portion that acquires the cluster information that is described above by performing the clustering.

Cluster Name Generation Processing

Next, cluster name generation processing in the present embodiment will be explained with reference to FIG. 6.

FIG. 6 is a flowchart that shows an overview of the cluster name generation processing in the present embodiment. First, the candidate district identification portion 15 generates a primary list of candidate districts (Step S201). Next, the relatedness assessment portion 17 generates a secondary list of candidate districts based on the primary list of the candidate districts (Step S203). Next, the cluster name generation portion 19 generates the cluster name 122 based on the secondary list of the candidate districts (Step S205).

Here, the candidate districts are the districts whose names may possibly be used for the cluster name 122, and they are selected from among predetermined locations on the map 100. The locations are predetermined districts on the map 100, each of which has a name, such as "Japan", "Tokyo Metropolis", or the like. The districts in the feature space for which names have been determined in advance, as they have for the locations on the map 100, are called named districts in this specification. In the present embodiment, the candidate districts are selected from among the locations that are named districts, and the name of the location that is selected from among the selected candidate districts based on specified criteria is used for the cluster name 122.

The primary list and the secondary list of the candidate districts are used for identifying the candidate districts. Hereinafter, these lists will be called simply the primary list and the secondary list. The primary list is a list in which, for each of the image content 110 items that have been grouped into the cluster 120, at least one location is identified that encompasses the position of the image content 110 item. In other words, the locations that are identified in the primary list encompass the position of at least one image content 110 item. In the secondary list, each of the districts that are included in the primary list is associated with a value that indicates an assessment of the district's relatedness to the cluster 120. The lists are stored in a storage device or the like that the information processing device 10 has, for example, and can be updated as necessary.

Hereinafter, the processing at each of the Steps S201 to S205 will be explained in detail with reference to FIGS. 7 to 16. Note that the processing at Step S201 corresponds to FIG. 7, the processing at Step S203 corresponds to FIG. 11, and the processing at Step S205 corresponds to FIG. 15.

1-3. Candidate District Identification Portion

FIG. 7 is a flowchart that shows the processing in the candidate district identification portion 15 in the present embodiment.

The candidate district identification portion 15 performs iterative processing for each of the image content 110 items that have been grouped into the cluster 120 (Step S301). Here, the candidate district identification portion 15 extracts the position information from the meta-information for the image content 110 item (Step S303). The extracted position information is the information that was appended as the information on the image capture position for the image content 110 item.

Figures 9, 10:
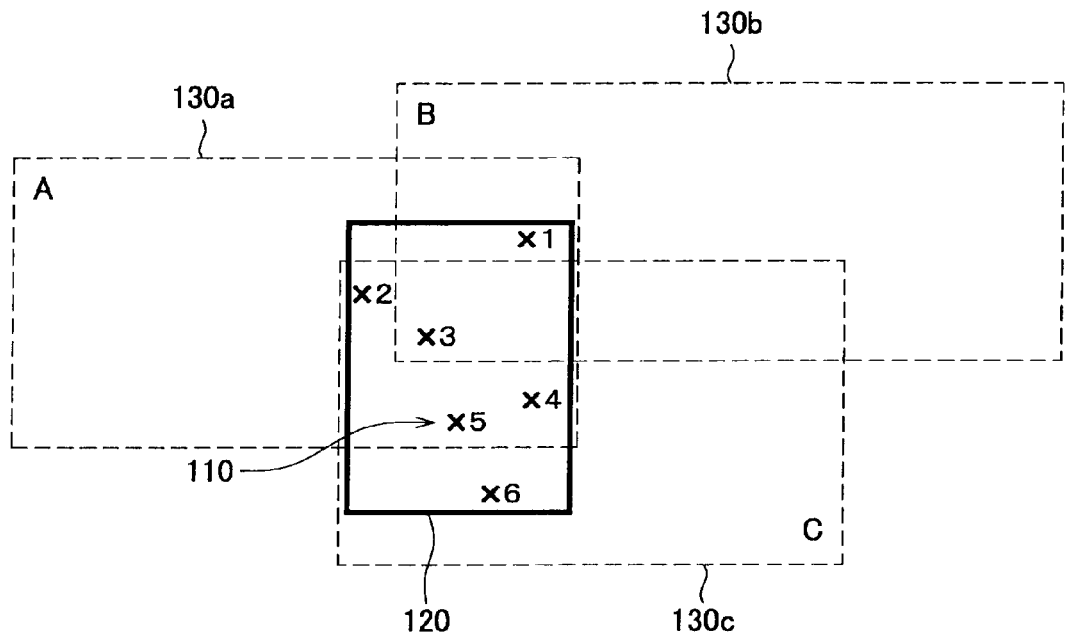
FIG. 9 is a figure for explaining relationships among image content, a cluster, and a candidate district in the first embodiment of the present disclosure.
FIG. 10 is a figure that shows an example of a primary list of candidate districts in the first embodiment of the present disclosure.

The candidate district identification portion 15 also adds to the primary list the locations that correspond to the extracted position information (Step S305). Here, the locations that correspond to the position information are locations on the map 100 that include the image capture position for the image content 110 item. The information on the locations is stored as a location list in the district name database 21. The information on the locations can be a list like that shown in FIG. 8, for example. The primary list can also be a list that includes not only the district names, but also information such as the image content 110 items that are included in the district, the area of overlap with the cluster 120, and the like, as does the list that is shown in FIG. 10, for example.

FIG. 8 is a figure that shows an example of a location list 25 that is stored in the district name database 21 in the present embodiment. Referring to FIG. 8, the location list 25 includes information on IDs, district names, district data, and district areas.

The IDs are IDs for identifying the location information. The district names are names that are assigned to the individual locations. The district data may include, for example, information that indicates a plurality of positions on the map 100, and the districts in the individual locations are defined by polygons for which the plurality of the positions serve as vertices. The district areas are the sizes of the individual locations on the map 100.

In the examples that are shown in FIG. 8, the location list 25 includes both landmark locations such as "Mount Fuji", "Makuhari Messe", "Kaihin Makuhari Station and vicinity", and the like, and address locations such as "Kanto Region", "Tokyo Metropolis", "Shinagawa Ward", and the like. The address locations are arranged in a tree structure of municipalities (for example, Shinagawa Ward"), prefectures (for example, Tokyo Metropolis), and regions (for example, Kanto Region), with higher ranking locations encompassing lower ranking locations.

In contrast, the landmark locations do not necessarily have an orderly structure such as a tree structure. For example, in the examples that are shown in FIG. 8, the district "Makuhari Messe" and the district "Kaihin Makuhari Station and vicinity" partially overlap one another, but neither one encompasses the other. The landmark locations can also be defined independently from the tree structure of address locations. Therefore, the relationships between the landmark locations and the address locations can be irregular.

For the reasons that are stated above, the number of the locations that are added to the primary list at Step S305 in FIG. 7 is not limited to one. First, because the address locations have a tree structure, in a case where the image capture position for an image content 110 item is included in a low ranking location, the same position is also included in a higher ranking location. For example, in a case where the image capture position for an image content 110 item is included in "Shinagawa Ward", the position is also included in "Tokyo Metropolis" and is further included in "Kanto Region".

Furthermore, a landmark location may possibly overlap irregularly with a plurality of locations, so the image capture position for an image content 110 item will sometimes be included in a plurality of locations. For example, in a case where the image capture position for an image content 110 item is between Makuhari Messe and Kaihin Makuhari Station, both "Makuhari Messe" and "Kaihin Makuhari Station and vicinity" can be identified as landmark locations that include the image capture position.

FIG. 9 is a figure for explaining relationships among the image content 110 items, the cluster 120, and candidate districts 130 in the present embodiment. FIG. 10 is a figure that shows an example of a primary list 140 that can be generated for the example in FIG. 9 in the present embodiment.

FIG. 9 shows the cluster 120 into which the image content 110 items have been grouped, as well as candidate districts 130a to 130c, which are locations that each include the image capture position for at least one of the image content 110 items that have been grouped into the cluster 120. The candidate district 130a is a district that has the district name "A" and encompasses the positions of the image content 110 items "1" to "5". The candidate district 130b is a district that has the district name "B" and encompasses the positions of the image content 110 items "1" and "3". The candidate district 130c is a district that has the district name "C" and encompasses the positions of the image content 110 items "2" to "6".

FIG. 10 shows an example of the primary list 140 that is generated by the candidate district identification portion 15's identifying of the candidate district 130 for each of the image content 110 items "1" to "6". In the example that is shown in FIG. 10, the primary list 140 includes the district names, the district areas, the content item IDs, the number of the content items, and information about the areas of overlap with the cluster district.

Of these, the district names and the district areas can be acquired from the location list 25 that is stored in the district name database 21. The content item IDs can be acquired from information on the corresponding image content 110 item when the candidate districts 130 are identified for each of the image content 110 items at Step S305 in FIG. 7, for example. The number of the content items can be acquired by setting a count to 1 when a given one of the candidate districts 130 is first identified for a given image content 110 item at Step S305, then increasing the count when the same candidate district 130 is identified for another image content 110 item. The areas of overlap with the cluster district can be computed based on the district data for each of the districts that are acquired from the location list 25 that is stored in the district name database 21 and on information about the districts for the cluster that is provided by the clustering portion 13.

Here, each of the candidate districts 130a to 130c is a district that encompasses at least one of the positions of the image content 110 items that have been grouped into the cluster 120, but at this point in time, it is not known which of the names of the candidate districts 130 will be most appropriate as the cluster name 122. Therefore, the candidate district identification portion 15 provides the information in the generated primary list 140 to the relatedness assessment portion 17, and the relatedness assessment portion 17 assesses the relatedness of each of the candidate districts 130 to the cluster 120.

1-4. Relatedness Assessment Portion

Figure 11:
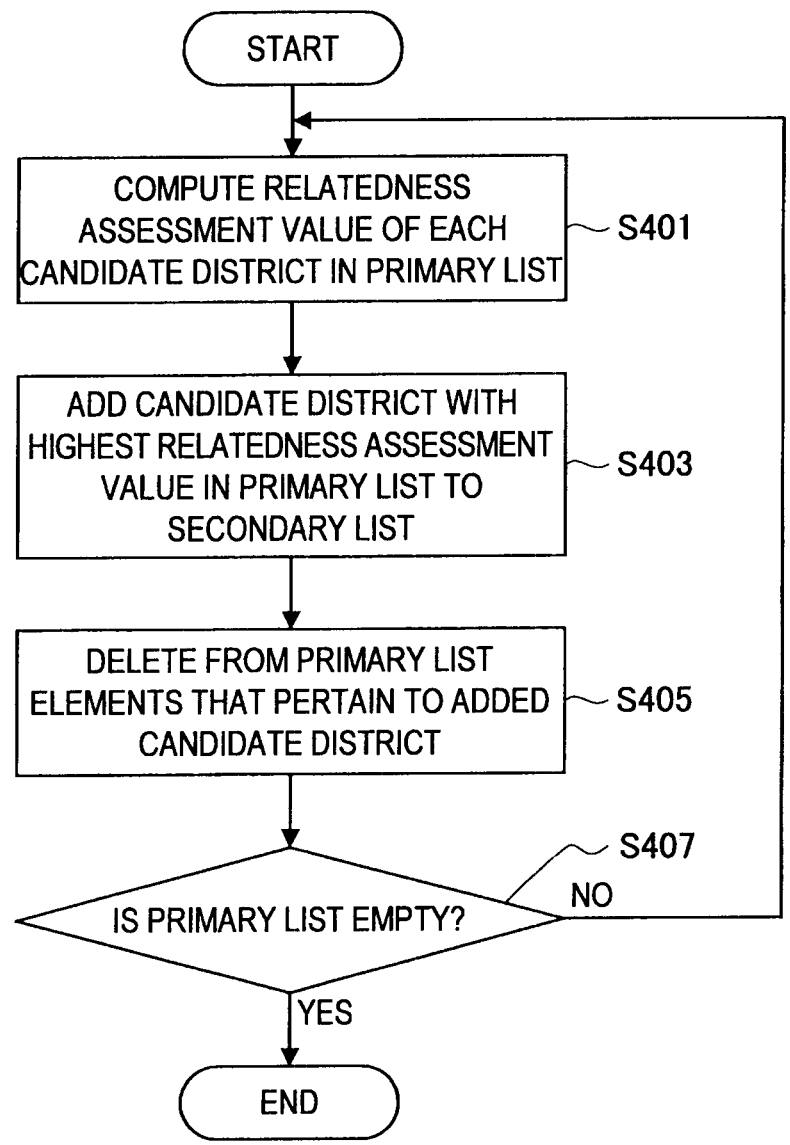
FIG. 11 is a flowchart that shows processing in a relatedness assessment portion in the first embodiment of the present disclosure.

FIG. 11 is a flowchart that shows processing in the relatedness assessment portion 17 in the present embodiment.

First, the relatedness assessment portion 17 computes a relatedness assessment value for each of the candidate districts 130 in the primary list 140 (Step S401). In the present embodiment, the relatedness assessment value is computed based on the number of the image content 110 items whose positions are encompassed by the candidate district 130 and on the area of overlap between the candidate district 130 and the cluster 120.

Next, the relatedness assessment portion 17 takes the candidate district 130 with the highest relatedness assessment value in the primary list 140 and adds it to the secondary list (Step S403). The relatedness assessment value that was computed for the candidate district 130 at Step S401 is associated with the information on the candidate district 130 that is added to the secondary list.

Next, the relatedness assessment portion 17 deletes from the primary list 140 the elements that are related to the candidate district 130 that was added to the secondary list at Step S403 (Step S405). As will be described later, the elements that are related to the candidate district 130 include the image content 110 items that are included in the candidate district 130, as well as the portion of the cluster 120 that overlaps with the candidate district 130.

Next, the relatedness assessment portion 17 determines whether or not the primary list 140 is empty (Step S407), and if it is empty, the relatedness assessment portion 17 terminates the processing. If the primary list 140 is not empty, the relatedness assessment portion 17 once again computes the relatedness assessment value for each of the candidate districts 130 in the primary list 140, from which were deleted at Step S405 the elements that are related to the candidate district 130 that was added to the secondary list at Step S403 (Step S401).

Having terminated the processing that is described above, the relatedness assessment portion 17 provides the information in the generated secondary list to the cluster name generation portion 19, and the cluster name generation portion 19 generates the cluster name 122 based on the relatedness assessment values for the candidate districts 130 that are included in the secondary list.

Thus, in the present embodiment, in the processing by the relatedness assessment portion 17, every time one of the candidate districts 130 from the primary list 140 is added to the secondary list, the elements that are related to that candidate district 130 are deleted from the primary list 140, after which the relatedness assessment value is computed once again for each of the candidate districts 130 that remain in the primary list 140. The processing will be explained in greater detail below.

Figure 12:
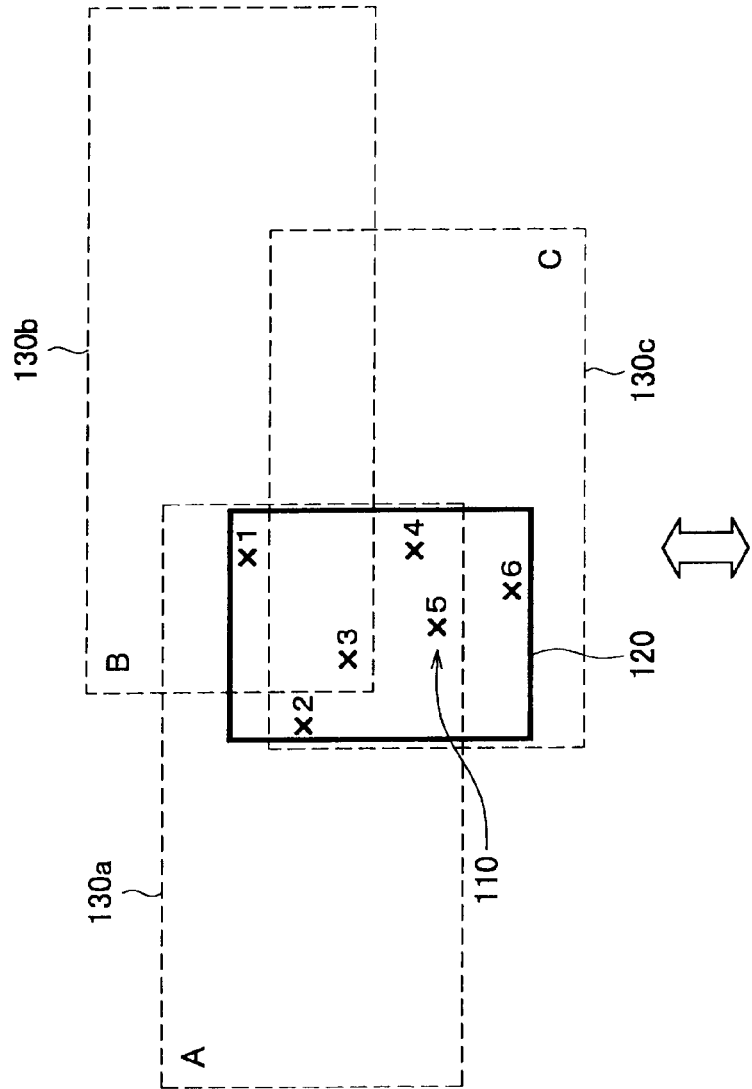
FIG. 12 is a figure for explaining the processing of the relatedness assessment portion in the first embodiment of the present disclosure.
Figure 13:
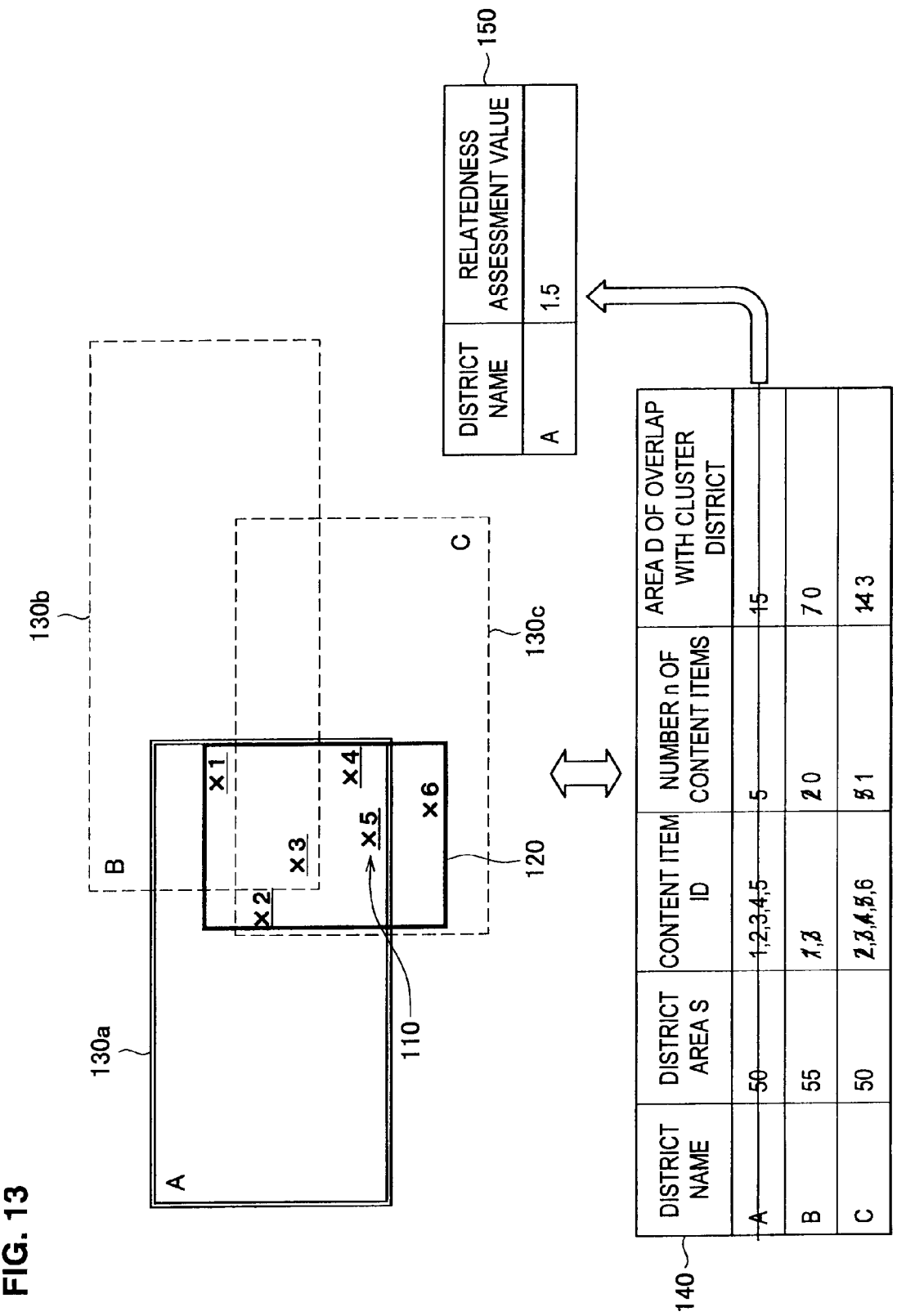
FIG. 13 is a figure for explaining the processing of the relatedness assessment portion in the first embodiment of the present disclosure.
Figure 14:
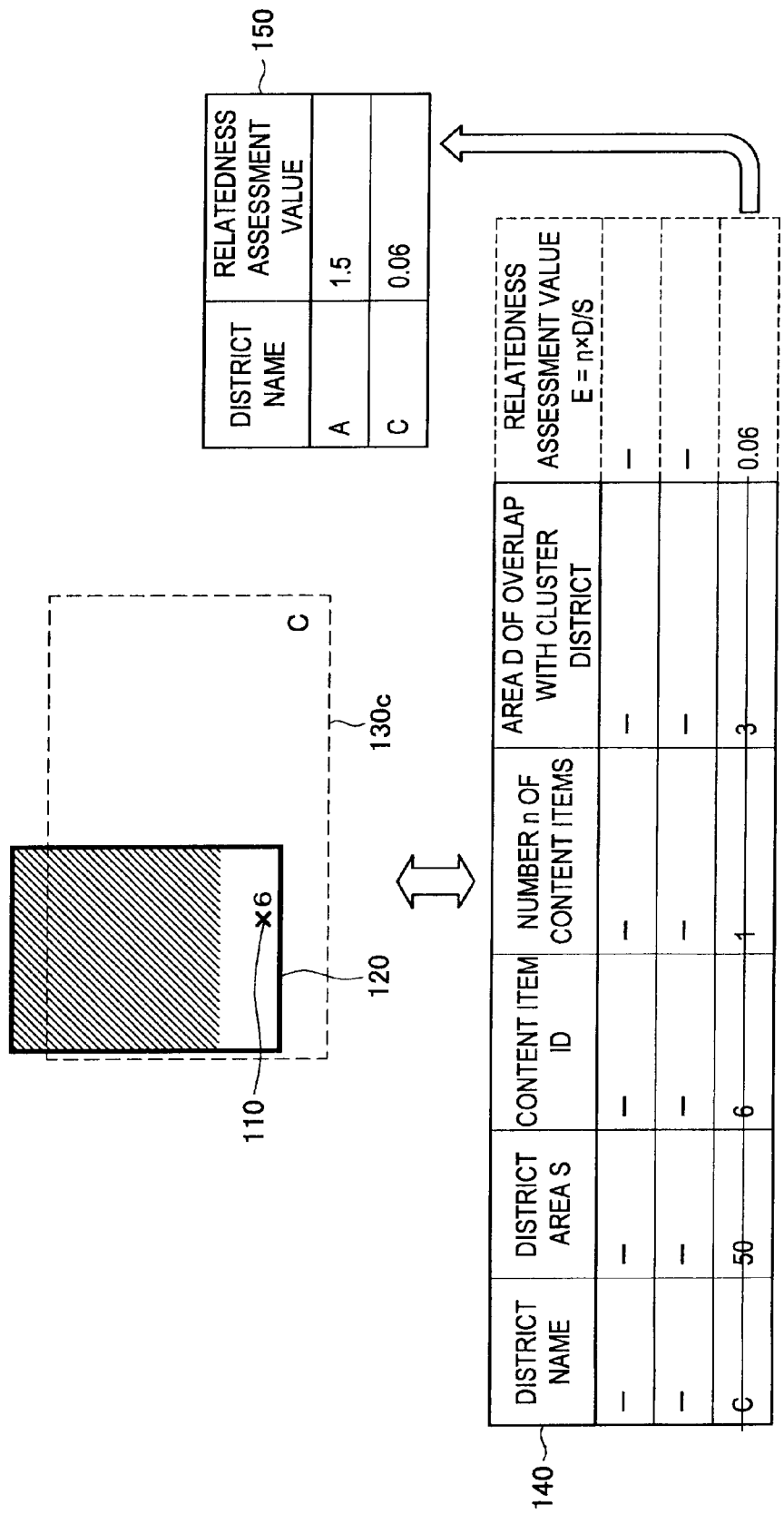
FIG. 14 is a figure for explaining the processing of the relatedness assessment portion in the first embodiment of the present disclosure.

FIGS. 12 to 14 are figures for explaining in greater detail the processing by the relatedness assessment portion 17 that has been explained with reference to FIG. 11. Note that the image content 110 items, the cluster 120, and the candidate districts 130 that are shown in FIGS. 12 to 14 are the same as in the example in FIGS. 9 and 10.

The first computation of the relatedness assessment values for the primary list 140 is shown in FIG. 12. In the present embodiment, a relatedness assessment value E for each of the candidate districts 130 is computed by Equation 1 below, using a number n of the content items, an area S of the candidate district 130, and an area D of the overlap between the candidate district 130 and the cluster 120.

$$E = n \times D/S \qquad \text{Equation 1}$$

Here, the candidate district 130a with the district name "A" includes five of the image content 110 items and has an overlap of 15 with the cluster 120, out of a district area of 50. Therefore, for the candidate district 130a, the relatedness assessment value E is 5×15/50=1.5.

In the same manner, the candidate district 130b with the district name "B" includes two of the image content 110 items and has an overlap of 7 with the cluster 120, out of a district area of 55. Therefore, for the candidate district 130b, the relatedness assessment value E is 2×7/55=0.25.

Furthermore, the candidate district 130c with the district name "C" includes five of the image content 110 items and has an overlap of 14 with the cluster 120, out of a district area of 50. Therefore, for the candidate district 130c, the relatedness assessment value E is 5×14/50=1.4.

These results show that, of the candidate districts 130a to 130c that are included in the primary list 140, the relatedness assessment value E for the candidate district 130a is the highest, followed by the relatedness assessment value E for the candidate district 130c, and that the relatedness assessment value E for the candidate district 130b is the lowest. In the present embodiment, it is determined according to these results that, of the candidate districts 130 that are included in the primary list 140, the one with the highest relatedness to the cluster 120, and therefore the one whose name is most appropriate for the cluster name 122, is the candidate district 130a.

FIG. 13 shows the addition of the first candidate district 130 to a secondary list 150. The results of the relatedness assessment value computations described above indicated that the relatedness assessment value E for the candidate district 130a is the highest in the primary list 140, so the relatedness assessment portion 17 adds the information on the candidate district 130a to the secondary list 150. The district name "A" for the candidate district 130a and the computed relatedness assessment value 1.5 are added to the secondary list 150. Note that other information that pertains to the candidate district 130a may also be added to the secondary list 150.

Here, the information on the candidate district 130a is deleted from the primary list 140 in conjunction with its being added to the secondary list 150. The elements that are related to the candidate district 130a are also deleted from the primary list 140. Specifically, a record that indicates the candidate district 130a is deleted from the primary list 140. Furthermore, the information on the image content 110 items "1" to "5" that were included in the candidate district 130a are deleted from the candidate districts 130b, 130c, as are the areas of the portions that overlapped the candidate district 130a within the district of the cluster 120.

The results of the deletion that is described above are shown in FIG. 13 by the information being crossed out and by revision symbols. The image capture positions for the image content 110 items "1" and "3" that were included in the candidate district 130b were both also included in the candidate district 130a, so the information for both is deleted from the primary list 140. This means that not even one of the image capture positions for the image content 110 items is included in the candidate district 130b in the primary list 140. Moreover, the portions of the cluster 120 district that overlapped with the candidate district 130b also all overlapped with the candidate district 130a, so they are also deleted. The result of these deletions is that, in the primary list 140, the candidate district 130b does not overlap with the cluster 120 district.

In this manner, for any of the candidate districts 130 that, as a result of the deletions of the image content 110 items and portions of cluster 120 district, no longer include the image capture positions of the image content 110 items and do not overlap with the cluster 120 district, the records that indicate the given candidate district 130 are deleted from the primary list 140. Therefore, the records for the candidate district 130b are also deleted from the primary list 140.

In contrast, in the candidate district 130c, of the image content 110 items "2" to "6", the image content 110 items "2" to "5", which were included in the candidate district 130a, are deleted. Thus the candidate district 130c includes only the image content 110 "6" in the primary list 140. Additionally, some of the portions of the candidate district 130c that overlapped with the cluster 120 also overlapped with the candidate district 130a, so the area of those portions is subtracted from the overlap area D. Note that the area of the district is 11. Therefore, when the elements that are related to the candidate district 130a are deleted, the area D of the candidate district 130c that overlaps with the cluster 120 district becomes 14−11=3 in the primary list 140.

The second computation of the relatedness assessment values for the primary list 140 is shown in FIG. 14. As described above, as a result of the addition of the candidate district 130a to the secondary list 150 based on the first computation of the relatedness assessment values, the information for the candidate district 130a and the elements that are related to the candidate district 130a are deleted from the primary list 140. The second computation of the relatedness assessment values is performed for the primary list 140 after the deletions have been made.

As described above, the result of the first computation of the relatedness assessment values is that the records for the candidate district 130a and the candidate district 130b have been deleted from the primary list 140. Therefore, in the second computation of the relatedness assessment values, the relatedness assessment value is computed for the candidate district 130c. The candidate district 130c in the primary list 140 at this point in time includes one of the image content 110 items and has an overlapping area of 3 with a cluster 120 district, out of a district area of 50. Therefore, for the candidate district 130c, the relatedness assessment value E is 1×3/50=0.06.

In the example that is shown in FIG. 14, there is only one of the candidate districts 130 in the primary list 140, so the relatedness assessment portion 17 automatically adds the candidate district 130c to the secondary list 150 as the candidate district 130 with the highest relatedness assessment value E. The district name "C" for the candidate district 130c and the computed relatedness assessment value 0.06 are added to the secondary list 150.

Here, the information on the candidate district 130c is deleted from the primary list 140 in conjunction with its being added to the secondary list 150. All of the information on the candidate districts 130 has thus been deleted from the primary list 140, and the relatedness assessment portion 17 terminates the processing that generates the secondary list 150 based on the primary list 140.

Criteria for Assessment of Relatedness

As indicated by Equation 1, in the present embodiment, the relatedness between the candidate district 130 and the cluster 120 is assessed based on the ratio of the overlapping portions of the candidate district 130 and the cluster 120 and on the number of the image content 110 items that are included in the candidate district 130.

Assessing the relatedness based on the overlapping portions of the candidate district 130 and the cluster 120 makes it possible to assign a higher relatedness assessment value to a candidate district 130 that has a larger area of overlap with the cluster 120 and a smaller size.

Assessing the relatedness based on the number of the image content 110 items that are included in the candidate district 130 makes it possible to assign a higher relatedness assessment value to a candidate district 130 that includes a larger number of the image content 110 items.

Each of these two criteria may be used alone for the relatedness assessment, and both may also be used in combination. Using only one of the criteria has the advantage of making the processing simpler. However, assessing the relatedness of the candidate district 130 by combining the two criteria that are described above has the advantages that are described below.

First, consider a case in which the relatedness is assessed based only on the number n of the image content 110 items that are included in the candidate district 130. In this case, the candidate district 130 that includes more of the image content 110 items is given a higher relatedness assessment value. Therefore, in the case of the address locations, for example, which have a tree structure, the relatedness assessment value tends to be higher for a higher ranking location, such that a prefecture has a higher value than a municipality, and a region has a higher value than a prefecture. Accordingly, in the case of a cluster 120 in which are grouped image content 110 items that are positioned across a plurality of locations, the name of the highest ranking location among the plurality of the locations is used for the cluster name 122. In this case, the size of the location that is used for the cluster name 122 does not correspond to the size of the cluster 120, so a natural cluster name 122 is not always generated.

Here, if the relatedness is also assessed based on the ratio D/S of the overlapping portions of the candidate district 130 and the cluster 120, the district area S becomes greater as the ranking of the location becomes higher, so the greater the size of the location becomes, the smaller the ratio D/S of the overlapping portions becomes, making the relatedness assessment value E smaller. Therefore, the relatedness assessment value for a candidate district 130 of a size that corresponds to the size of the cluster 120 can be made the highest, even if the candidate district 130 includes a larger number of the image content 110 items.

Next, consider a case in which the relatedness is assessed based only on the ratio D/S of the overlapping portions of the candidate district 130 and the cluster 120. In this case, the candidate district 130 for which the ratio D/S of the portion that overlaps with the cluster 120 is greater is given a higher relatedness assessment value. Accordingly, for a small location that is encompassed by the cluster 120, for example, the value of the ratio D/S of the overlapping portions is 1, that is, the relatedness assessment value E reaches its maximum value. In this case, the name of the small location that includes a small number of the image content 110 items is selected for the cluster name 122, regardless of the size of the cluster 120, so a natural cluster name 122 is not always generated.

Here, if the relatedness is also assessed based on the number n of the image content 110 items that are included in the candidate district 130, the number n of the image content 110 items that are included in the location becomes smaller as the location becomes smaller, so the relatedness assessment value E becomes smaller. Therefore, among the candidate districts 130 for which the ratios D/S of the portions that overlap with the cluster 120 are somewhat large, the candidate district 130 that includes the largest number of the image content 110 items can be given the highest relatedness assessment value.

Assessing the relatedness of the candidate district 130 according to the combination of the two criteria thus makes it possible to select a candidate district 130 for which the cluster name 122 is generated by balancing the point of including the most image content 110 items with the point of being closest in size to the cluster 120.

Note that in a case where the cluster name 122 is generated as it is in the present embodiment, using the names of the address locations, which have a tree structure, and the names of the landmark locations, which overlap with one another in an irregular manner, the combining of the two criteria that are described above is an effective way to assess the relatedness of candidate district 130 and the cluster 120. However, if the structures of the named districts are different, as they are in the case of another embodiment that will be described later, it can be sufficiently effective to assess the relatedness using only one of the criteria.

Variations of the Relatedness Assessment Value

The relatedness assessment value E may also be computed by a formula other than Equation 1. For example, the relatedness assessment value E may also be computed by a formula that includes weighting that is based on a specified attribute, such as geographic attribute, time period, or emotion. The attribute can be, for example, a category of the candidate district 130, the popularity of the candidate district 130, the population or the number of households in the candidate district 130, whether or not the candidate district 130 is a major city, the seat of a prefectural government, or a city that is designated by ordinance, the number of times that the candidate district 130 has been selected by an editing operation by the user, or the like.

Among these, the category of the candidate district 130 may be a commercial facility, a public facility, a residential facility, a tourist attraction, or the like. For example, assigning a weighting to a specific category that the user has set for the capturing of the image content 110 makes it possible to make the relatedness assessment value E higher for a candidate district 130 in that category, making that candidate district 130 more likely to be used for the cluster name 122. Thus, in a case where the tourist attraction category has been selected by the user, for example, it becomes possible for the names of landmark locations that are tourist attractions to be given priority in being included in the cluster names 122.

Weighting according to the popularity, the population, or the like of the candidate district 130 makes it possible to incorporate the importance, the name recognition, and the like of the candidate district 130 into the generation of the cluster name 122. This makes it possible for the names of locations whose names the user is more likely to know, such as landmark locations like more popular theme parks, tourist attractions, and the like, or larger cities, for example, to be given priority in being included in the cluster names 122.

1-5. Cluster Name Generation Portion

Figure 15:
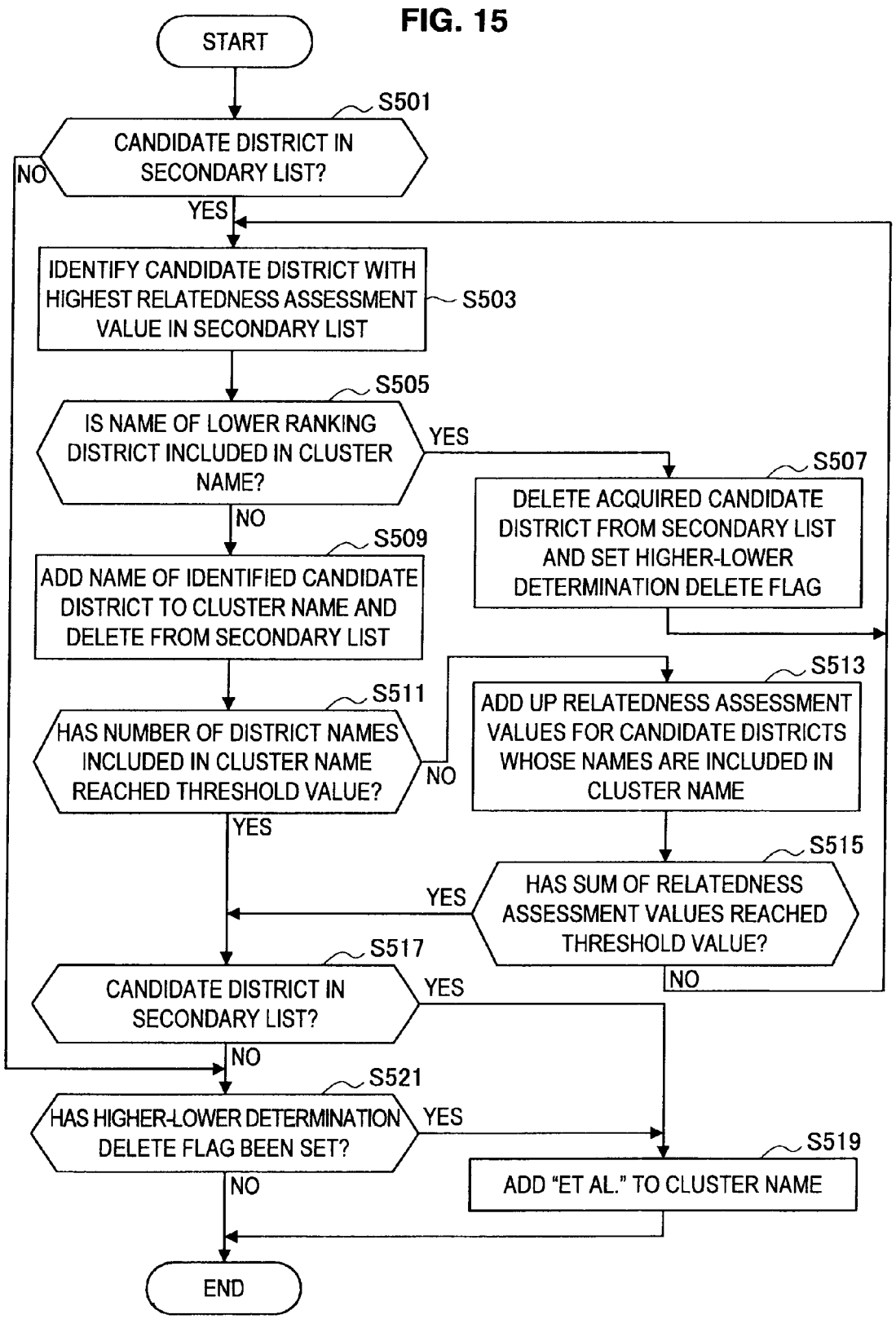
FIG. 15 is a flowchart that shows processing in a cluster name generation portion in the first embodiment of the present disclosure.

FIG. 15 is a flowchart that shows processing in the cluster name generation portion 19 in the present embodiment.

First, the cluster name generation portion 19 determines whether or not any candidate district 130 exists in the secondary list 150 (Step S501). In the case where the determination is made for the first time for the secondary list 150 that has been provided from the relatedness assessment portion 17, at least one candidate district 130 exists in the secondary list 150. Here, in a case where it is determined that no candidate district 130 exists in the secondary list 150, the cluster name generation portion 19 jumps to Step S521, which will be described later, and begins post-processing for the cluster name generation.

In a case where it is determined at Step S501 that a candidate district 130 does exist in the secondary list 150, the cluster name generation portion 19 identifies the candidate district 130 that has the highest relatedness assessment value in the secondary list 150 (Step S503). The candidate district 130 that is identified here is the district that has been determined to have the highest degree of relatedness to the cluster 120 of all the candidate districts 130 that exist in the secondary list 150 at this time. In other words, the cluster name generation portion 19 identifies the candidate districts 130 in the secondary list 150 in descending order by the degree of relatedness to the cluster 120 that was determined by the relatedness assessment portion 17.

Next, the cluster name generation portion 19 determines whether or not the name of a district that is lower ranking than the candidate district 130 that was identified at Step S503 is already included in the cluster name 122 (Step S505). In a case where the name of a lower ranking district is already included in the cluster name 122, the cluster name generation portion 19 deletes the identified candidate district 130 from the secondary list 150 and sets a higher-lower determination delete flag (Step S507). The higher-lower determination delete flag is a flag that is maintained for the processing of each individual cluster 120, and it is referenced at Step S521, which will be described later. Next, the cluster name generation portion 19 returns to Step S501 and repeats the processing that identifies the candidate district 130 in the secondary list 150.

Here, the lower ranking districts are defined, for example, for districts that have a tree structure like the "municipality-prefecture-region" structure of the address locations, by the hierarchical relationships among the districts. For example, "Shinagawa Ward" is a lower ranking district than "Tokyo Metropolis", and "Tokyo Metropolis" is a lower ranking district than "Kanto Region". In the present embodiment, in a case where "Shinagawa Ward" is already included in the cluster name 122, for example, if the candidate district 130 for "Tokyo Metropolis" is identified in the secondary list 150, the information on the candidate district 130 for "Tokyo Metropolis" is deleted from the secondary list 150. This is done because it is considered unnatural for district names that are in a hierarchical relationship to be used jointly as the cluster name 122, as in "Shinagawa Ward, Tokyo Metropolis".

Note that a situation in which the name of a higher ranking district than the identified candidate district 130 is already included in the cluster name 122 does not occur in the processing in the present embodiment, so no such determination is made. Furthermore, as described previously, no hierarchical relationship has been established between the address locations and the landmark locations in the present embodiment, so the name of a landmark location and the name of an address location that encompasses the landmark location can be used jointly in the cluster name 122, as in "Tokyo Tower, Tokyo Metropolis", for example.

In a case where it is determined at Step S505 that the name of a district that is lower ranking than the identified candidate district 130 is not included in the cluster name 122, the cluster name generation portion 19 adds the name of the identified candidate district 130 to the cluster names 122 and deletes the candidate district 130 from the secondary list 150 (Step S509).

At this point, in the present embodiment, the cluster name 122 is generated by sequentially linking the names of the candidate districts 130. For example, in a case where the candidate districts 130 with the names "Chinatown" and "Shinagawa Ward" have been identified in the secondary list 150 in that order, the cluster name 122 is generated as "Chinatown, Shinagawa Ward".

Next, the cluster name generation portion 19 determines whether or not the number of the candidate district 130 names that are included in the cluster name 122 has reached a threshold value (Step S511). In the present embodiment, an upper limit threshold value T1 is set for the number of the names that are included in the cluster name 122. This is done in order to prevent the cluster name 122 from becoming too long, for example, such that the cluster 120 and the image content 110 would become less recognizable visually when they are displayed on the map 100. In a case where it is determined that the number of the names that are included in the cluster name 122 has reached the threshold value T1, the cluster name generation portion 19 proceeds to Step S517, which will be described later, and begins the post-processing for the cluster name generation.

Note that the threshold value T1 for the number of the names that are included in the cluster name 122 can be set automatically to an appropriate value, taking into account the balancing of the display according to the scale of the map 100, the size of the cluster 120, and the like, for example. For example, in a case where the scale of the map 100 is comparatively small, it is considered appropriate for the threshold value T1 to be set to a comparatively small value. It is also considered appropriate for the threshold value T1 to be set to a comparatively small value in a case where the size of the cluster 120 is comparatively small. The threshold value T1 may also be set to any desired value by a user operation.

On the other hand, at Step S511, in a case where the number of the names that are included in the cluster name 122 has not reached the threshold value T1, the cluster name generation portion 19 adds up the relatedness assessment values for the candidate districts 130 whose names have been added to the cluster name 122 up to this point (Step S513). The relatedness assessment values can be acquired from the secondary list 150.

In the present embodiment, the sum of the relatedness assessment values is used as an indicator of whether the cluster name 122 adequately describes the district of the cluster 120. For example, in a case where the image capture positions of the image content 110 items that have been grouped into the cluster 120 include positions that are concentrated in a single candidate district 130, the sum of the relatedness assessment values is fairly high at the point when the name of that candidate district 130 is first added to the cluster name 122. On the other hand, in a case where the image capture positions of the image content 110 items that have been grouped into the cluster 120 include positions that are distributed among a plurality of the candidate districts 130, the relatedness assessment values of the individual candidate districts 130 are comparatively low, so the names of a plurality of the candidate districts 130 can be added to the cluster name 122 before the sum of the relatedness assessment values reaches the same value as in the first example.

Next, the cluster name generation portion 19 determines whether or not the sum of the relatedness assessment values that were added up at Step S513 has reached a threshold value (Step S515). In the present embodiment, a lower limit threshold value T2 is set for the sum of the relatedness assessment values of the candidate districts 130 whose names are included in the cluster name 122. As explained above, the sum of the relatedness assessment values is used as an indicator of whether the cluster name 122 adequately describes the district of the cluster 120. The threshold value T2 is provided so that an unnecessarily large number of names will not be added to the cluster name 122.

Note that the threshold value T2 can be set automatically to an appropriate value, according to the scale of the map 100, the size of the cluster 120, and the like, for example. The appropriate value for the threshold value T2 may also be set dynamically, according to an average value of the relatedness assessment values of the candidate districts 130 that are included in the secondary list 150. The threshold value T2 may also be set to any desired value by a user operation.

In a case where it is determined at Step S515 that the sum of the relatedness assessment values that were added up has reached the threshold value T2, the cluster name generation portion 19 proceeds to Step S517, which will be described later, and begins the post-processing for the cluster name generation. On the other hand, in a case where it is determined that the sum of the relatedness assessment values that were added up has not reached the threshold value T2, the cluster name generation portion 19 returns to Step S501 and repeats the processing that identifies the candidate district 130 in the secondary list 150.

In a case where it has been determined at Step S511 that the number of the names that are included in the cluster name 122 has reached the threshold value T1, as well as in a case where it has been determined at Step S515 that the sum of the relatedness assessment values has reached the threshold value T2, the cluster name generation portion 19 determines whether or not a candidate district 130 is remaining in the secondary list 150 (Step S517). In a case where it is determined that information on a candidate district 130 is remaining in the secondary list 150, the cluster name generation portion 19 adds "et al." to the cluster name 122 (Step S519).

On the other hand, in a case where it is determined at Step S517 that no information on a candidate district 130 is remaining in the secondary list 150, the cluster name generation portion 19 determines whether or not the higher-lower determination delete flag has been set (Step S521). The higher-lower determination delete flag is the flag that is set at Step S507 when a candidate district 130 is deleted from the secondary list 150 without its name being added to the cluster name 122. The cluster name generation portion 19 also adds "et al." to the cluster name 122 (Step S519) in a case where it is determined at Step S521 that the higher-lower determination delete flag has been set.

The adding of "et al." to the cluster name 122 in this manner at Step S519 is done in a case where a candidate district 130 exists whose name is not added to the cluster name 122, even though it is included in the secondary list 150 (hereinafter also called the initial secondary list 150) that was generated by the relatedness assessment portion 17.

As is clear from the previously described processing by the relatedness assessment portion 17 that generates the secondary list 150, each of the candidate districts 130 that are included in the initial secondary list 150 includes at least one image capture position of an image content 110 item that is not included in the other candidate districts 130 in the secondary list 150. Therefore, to say that a candidate district 130 exists that is included in the initial secondary list 150, but whose name is not included in the cluster name 122, is to say that the names that correspond to the image capture positions of the image content 110 items that are included in that candidate district 130 are not included in the cluster name 122.

Therefore, in this sort of case, the cluster name generation portion 19, by appending "et al." to the cluster name 122, indicates that there is an image content 110 item that is included in the cluster 120, but that has its image capture position in a district other than the district that is indicated by the names in the cluster name 122.

Figure 16:
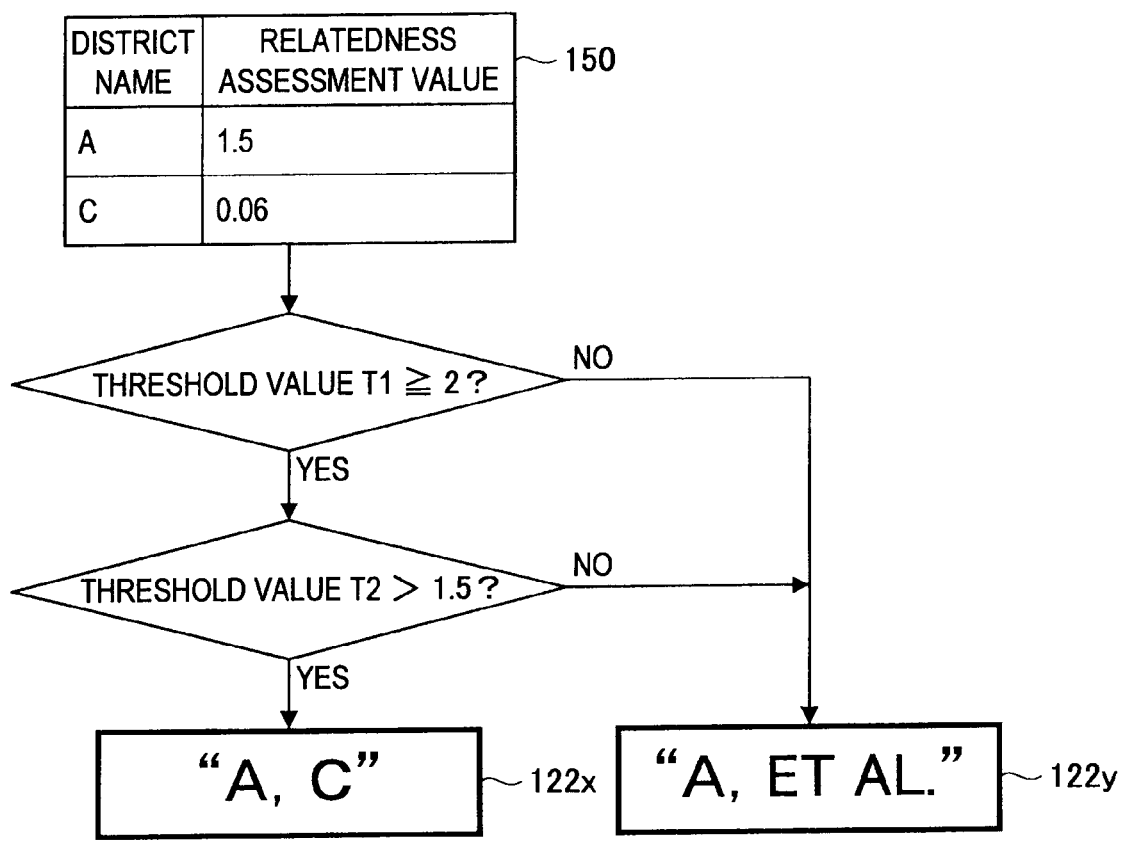
FIG. 16 is a figure for explaining threshold values that can be set in the first embodiment of the present disclosure.

FIG. 16 is a figure for explaining the threshold values that are set for the processing by the cluster name generation portion 19 in the present embodiment. Note that the secondary list 150 that is shown in FIG. 16 is the same as the secondary list 150 that was generated in the example in FIGS. 12 to 14. Note also that in the explanation that follows, the steps that were explained in FIG. 15 will be referenced as necessary.

In the example that is shown in FIG. 16, the initial secondary list 150 includes the information on the candidate district 130a, for which the district name is "A" and the relatedness assessment value is 1.5, and the information on the candidate district 130c, for which the district name is "C" and the relatedness assessment value is 0.06.

First, in a case where the threshold value T1 for the number of the names that can be included in the cluster name 122 is not at least 2, that is, in a case where only one name can be included in the cluster name 122, after the name "A" has been added to the cluster name 122 at Step S509, the determination is made at Step S511 that the number of the names that are included in the cluster name 122 has reached the threshold value T1. Therefore, the processing that adds the names to the cluster name 122 is terminated at this point in time, and the name "C" of candidate district 130c is not included in the cluster name 122.

However, the image capture position for the image content 110 item that is indicated as "6" in FIG. 12 is not included in the candidate district 130a. Therefore, if the cluster name 122 is defined simply as "A", the fact that the image content 110 item "6" is included in the cluster 120 is not indicated by the cluster name 122. Therefore, the cluster name generation portion 19 adds "et al." to the cluster name 122 at Step S519. A cluster name 122y of "A, et al." is thus generated.

In contrast, in a case where the threshold value T1 is not less than 2, it is possible for the district name "C" for the candidate district 130c to be included in the cluster name 122. However, in a case where the threshold value T2 for the sum of the relatedness assessment values is not greater than 1.5, after the name "A" has been added to the cluster name 122 at Step S509, it is determined at Step S515 that the sum of the relatedness assessment values (which, at this point in time is equal to the relatedness assessment value for the candidate district 130a, or 1.5) has reached the threshold value T2. Therefore, the cluster name 122y of "A, et al." is thus generated, in the same manner as in the case described above.

On the other hand, in a case where the threshold value T2 is greater than 1.5, the determination that the sum of the relatedness assessment values has reached the threshold value T2 is not made at Step S515, so the processing returns to Step S501, and the processing that adds a name to the cluster name 122 is performed once again. Thus, the second time that Step S509 is performed, the name "C" for the candidate district 130c is added to the cluster name 122. A cluster name 122x of "A, C" is thus generated.

2. Second Embodiment

Figure 17:
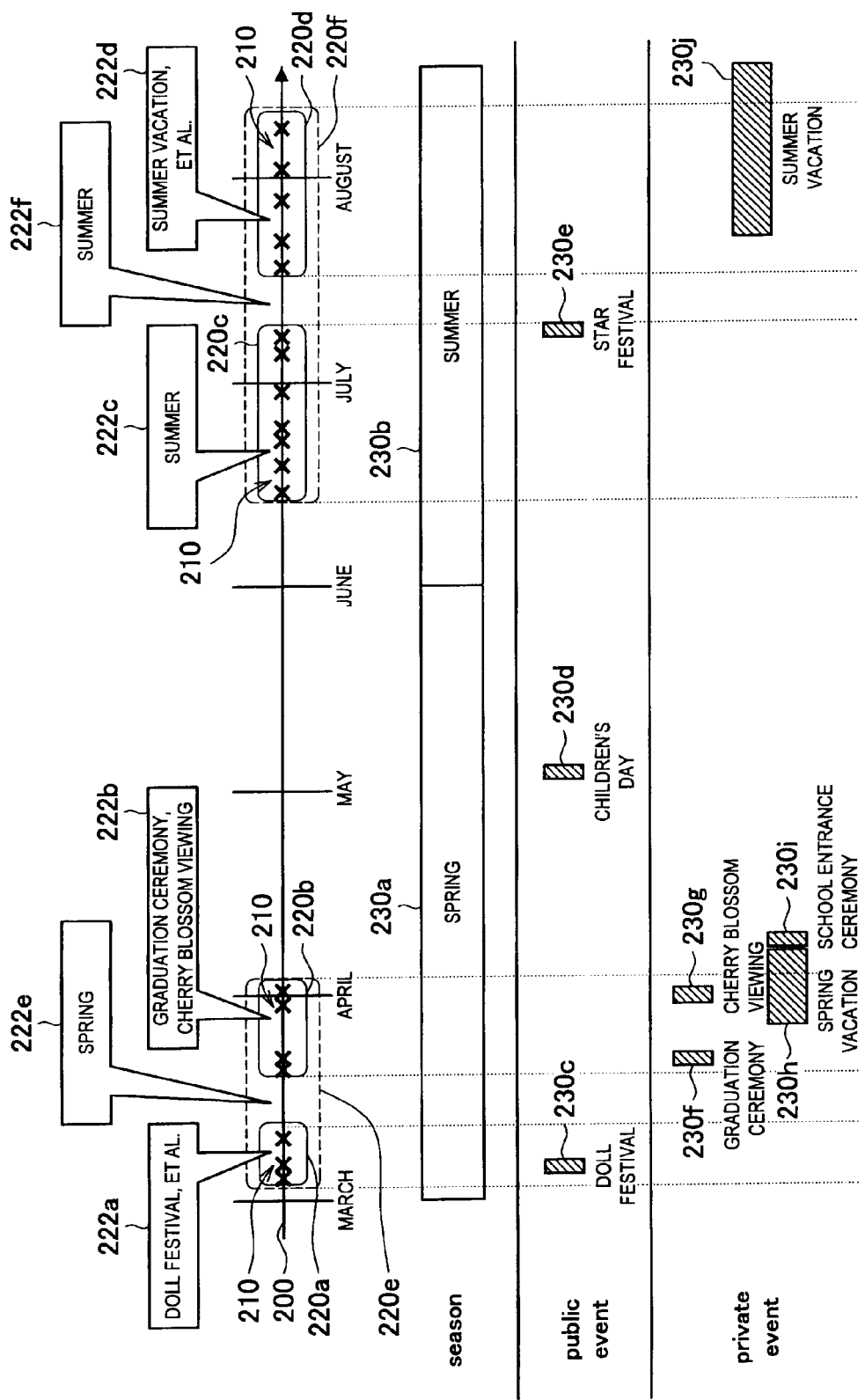
FIG. 17 is a figure that shows an example of the cluster name generation according to a second embodiment of the present disclosure.

Next, a second embodiment of the present disclosure will be explained with reference to FIG. 17. FIG. 17 is a figure that shows an example of the cluster name generation according to the present embodiment.

Referring to FIG. 17, image content 210 items are image content items that have been captured by a device that has an image capture function, such as a digital camera, a mobile telephone, or the like. Information on the date and time of the image capture is appended as meta-information to each of the image content 210 items. The image content 210 items are positioned on a time axis 200 according to the dates and times of their capture. The image content 210 items are also grouped into clusters 220 according to the dates and times of their capture.

Here, the time axis 200 is a one-dimensional feature space, and the image content 210 items can be said to be data that are described by their positions in the feature space. Event periods 230 are also established on the time axis 200 in advance. The event periods 230 are defined by time periods and names, based on seasons, events, or the like, for example. The time periods are districts on the time axis 200. Therefore, the event periods 230 can be called named districts.

In the present embodiment, the cluster names are generated by replacing the geographical districts in the first embodiment that is described above with temporal districts, that is, time periods.

To be specific, first, the candidate district identification portion 15 of the information processing device 10 generates the primary list 140 of the candidate districts based on the event periods 230. In the primary list 140, the event periods 230 are identified that each include the image capture date and time for at least one of the image content 210 items that is grouped into the cluster 220. The time periods and the names for the event periods 230 are acquired from the district name database 21.

Next, for each of the event periods 230 that are included in the primary list 140, the relatedness assessment portion 17 computes the assessment value for its relatedness to the cluster 220. The relatedness assessment value can be computed based on the number of the image content 210 items whose image capture dates and times are included in the event period 230, and on the length of any overlap between the time period of the event period 230 and the time period of the cluster 220. The relatedness assessment portion 17 takes the event period 230 that has the highest relatedness assessment value in the primary list 140 and adds it to the secondary list 150, along with information on its relatedness assessment value. The relatedness assessment portion 17 then deletes the information on that event period 230 from the primary list 140 and repeats the processing until the primary list 140 is empty.

Next, for each of the event periods 230 that are included in the secondary list 150, the cluster name generation portion 19 adds the name of the event period 230 to a cluster name 222, in descending order by the relatedness assessment value. The threshold value T1 for the number of the names that can be included in the cluster name 222 and the threshold value T2 for the sum of the relatedness assessment values for the event periods 230 whose names are included in the cluster name 222 can also be set in the present embodiment. The cluster name generation portion 19 repeats the adding of the names of the event periods 230 to the cluster name 222 until the threshold value T1 is reached for the number of the names that are included in the cluster name 222, until the threshold value T2 is reached for the sum of the relatedness assessment values, or until the secondary list 150 is empty.

Note that the details of the cluster name generation processing that is described above are the same as in the first embodiment, so a detailed explanation will be omitted. The clustering of the image content items according to the image capture date and time is described in Japanese Patent Application Publication No. JP-A 4577173, for example. The method that is described in Japanese Patent Application Publication No. JP-A 4577173 can also be used as desired for the clustering in the present embodiment, so a detailed explanation of the clustering processing will also be omitted.

In FIG. 17, an example is shown in which the image content 210 items are grouped into low ranking clusters 220a to 220d and high ranking clusters 220e, 220f. The image content 210 items may thus be grouped into clusters 220 that have a tree structure.

Of the event periods 230 that are defined in the example that is shown in FIG. 17, event periods 230a, 230b are event periods with "season" attributes of "Spring" and "Summer". Furthermore, event periods 230c to 230e are event periods with "public event" attributes of "Doll Festival" and "Children's Day". Event periods 230f to 230j are event periods with "private event" attributes of "Graduation Ceremony" and "Cherry Blossom Viewing". The event periods 230c to 230j with the "public event" attributes and the "private event" attributes are encompassed by the event periods 230a, 230b with the "season" attributes. In other words, a tree structure can be said to exist between the event periods 230a, 230b and the event periods 230c to 230j. On the other hand, an orderly structure does not necessarily exist among the event periods 230c to 230j, with the respective time periods being distributed separately and portions of the them overlapping.

Hereinafter, the cluster name generation processing in the present embodiment will be explained by explaining the generation of the cluster names 222 for the individual clusters 220 in concrete terms.

Cluster Name Generation Example 1

First, the cluster 220a will be explained as an example. The cluster 220a includes two image content 210 items that were captured during the "Doll Festival" event period 230c and one image content 210 item that was captured a little later. The three image content 210 items are all included in the "Spring" event period 230a. In this case, the candidate district identification portion 15 identifies the "Doll Festival" event period 230c and the "Spring" event period 230a in the primary list 140.

Here, of the event periods 230 that have been identified in the primary list 140, the "Doll Festival" event period 230c includes a comparatively large number of the image content 210 items, and its ratio of its overlapping district with the cluster 220a is large, so it is given a higher relatedness assessment value. In contrast, the "Spring" event period 230a includes all of the image content 210 items in the cluster 220a, but the time period of the event period 230a is longer than that of the cluster 220a, so the ratio of its overlapping period with the cluster 220a is small, and it is given a lower relatedness assessment value. Therefore, in the processing by the relatedness assessment portion 17, the "Doll Festival" event period 230c is added to the secondary list 150 first. The "Spring" event period 230a is also added to the secondary list 150 as the event period 230 that includes the one remaining image content 210 item.

As described above, the event period 230c can be said to be lower ranking than the event period 230a in the tree structure. Accordingly, the cluster name generation portion 19 may define a cluster name 222a as "Doll Festival, et al.", as shown in FIG. 17, by adding "et al." instead of including the name "Spring" of the event period 230a, which is higher ranking among the names of the event periods 230 that are included in the secondary list 150. Furthermore, unlike in the case of the location names, in a case where it is not considered particularly strange to jointly use names that have a higher-lower relationship, the cluster name 222a may also be defined as "Doll Festival, Spring" by including the name "Spring" of the event period 230a in the cluster name 222a.

Cluster Name Generation Example 2

Next, the cluster 220b will be explained as an example. The cluster 220b includes two image content 210 items that were captured during the "Graduation Ceremony" event period 230f and two image content 210 items that were captured during a time period when the "Cherry Blossom Viewing" event period 230g and the "Spring Vacation" event period 230h overlap. The four image content 210 items are all included in the "Spring" event period 230a. In this case, the candidate district identification portion 15 identifies the "Graduation Ceremony" event period 230f, the "Cherry Blossom Viewing" event period 230g, the "Spring Vacation" event period 230h, and the "Spring" event period 230a in the primary list 140.

Here, of the event periods 230 that have been identified in the primary list 140, the ratios of the overlapping districts with the cluster 220b are large for the "Graduation Ceremony" event period 230f and the "Cherry Blossom Viewing" event period 230g, and they include comparatively large numbers of the image content 210 items, so they are given higher relatedness assessment values. In contrast, the "Spring Vacation" event period 230h includes the same number of the image content 210 items as the event period 230g, but the time period of the event period 230h is longer, so the ratio of its overlapping period with the cluster 220b is small, and it is given a lower relatedness assessment value. The "Spring" event period 230a includes all of the image content 210 items in the cluster 220b, but the time period of the event period 230a is longer than that of the cluster 220b, so the ratio of its overlapping period with the cluster 220b is small, and it is given a lower relatedness assessment value.

Therefore, in the processing by the relatedness assessment portion 17, the "Graduation Ceremony" event period 230f and the "Cherry Blossom Viewing" event period 230g are added to the secondary list 150 first. When these event periods 230 are combined, they encompass the image capture dates and times for all of the image content 210 items in the cluster 220b. Therefore, in conjunction with the adding of these event periods 230 to the secondary list 150, the records for the remaining "Spring Vacation" event period 230h and "Spring" event period 230a are deleted from the primary list 140. Accordingly, the "Graduation Ceremony" event period 230f and the "Cherry Blossom Viewing" event period 230g are added to the secondary list 150. The setting values for the threshold value T1 and the threshold value T2 also apply, but in the example that is shown in FIG. 17, the names of these event periods 230 are used jointly for the cluster name 222b, which becomes "Graduation Ceremony, Cherry Blossom Viewing".

In the example of the cluster 220b that is described above, consider a case in which the assessment values for the relatedness of the event periods 230 to the cluster 220 are computed using the number of the content items, in the same manner as in the first embodiment, and the ratios of the time periods of the event periods 230 that overlap with the cluster 220. In this case, the "Graduation Ceremony" event period 230f and the "Cherry Blossom Viewing" event period 230g each include two of the image content 210 items, and their time periods overlap completely with the cluster 220b, so they have the same relatedness assessment values. In order to deal with this sort of case, a setting may be made that says that in a case where a plurality of the event periods 230 have the same relatedness assessment value, they will be added to the secondary list 150 with priority given to the event period 230 that is the earliest, for example. Thus, in a case where the event periods 230 have equal degrees of relatedness to the cluster 220, the cluster name 222 can be generated by starting the name with the event period 230 that is the earliest, as with "Graduation Ceremony, Cherry Blossom Viewing" in the cluster name 222b.

Cluster Name Generation Example 3

Next, the cluster 220c will be explained as an example. The cluster 220c includes one image content 210 item that was captured during the "Star Festival" event period 230e and six image content 210 items that were captured earlier. The seven image content 210 items are all included in the "Summer" event period 230b. In this case, the candidate district identification portion 15 identifies the "Star Festival" event period 230e and the "Summer" event period 230b in the primary list 140.

Here, of the event periods 230 that have been identified in the primary list 140, the entire time period of the "Star Festival" event period 230e overlaps with the cluster 220c, but it includes only one of the seven image content 210 items that are included in the cluster 220c. In contrast, a portion of the time period of the "Summer" event period 230b overlaps with the cluster 220c, but it includes all of the seven image content 210 items that are included in the cluster 220c.

Therefore, in the example that is shown in FIG. 17, although it also depends on the settings for the computation of the relatedness assessment values, the relatedness assessment value for the "Summer" event period 230b is higher, so the "Summer" event period 230b is added first to the secondary list 150 of the candidate districts. The "Summer" event period 230b includes all of the image content 210 items that are included in the cluster 220c. Therefore, in conjunction with the adding of the "Summer" event period 230b to the secondary list 150, the record for the "Star Festival" event period 230e is deleted from the primary list 140. Accordingly, only the "Summer" event period 230b is added to the secondary list 150. The cluster name 222c thus becomes "Summer".

The cluster names 222d to 222f are generated for the clusters 220d to 220f in the same manner as in the examples that are described above.

The cluster 220d mainly includes image content 210 items that are included in the "Summer Vacation" event period 230j, but it also includes an image content 210 item that is not included in the event period 230j. Therefore, the cluster name 222d becomes "Summer Vacation, et al."

The cluster 220e includes image content 210 items that are included in the "Doll Festival", the "Graduation Ceremony", and the "Cherry Blossom Viewing" event periods 230c, 230f, 230g. In the example that is shown in FIG. 17, the event periods 230c, 230f, 230g each include fewer of the image content 210 items than are included in the entire cluster 220e, so the relatedness assessment value for the higher ranking event period 230a becomes greater. Therefore, the cluster name 222e becomes "Spring".

The cluster 220f includes image content 210 items that are included in the "Star Festival" and the "Summer Vacation" event periods 230e, 230j and image content 210 items that are not included in either of the event periods 230e, 230j. In the example that is shown in FIG. 17, the relatedness assessment value for the higher ranking event period 230b is greater than the values for the event periods 230e, 230j. Therefore, the cluster name 222f becomes "Summer".

3. Third Embodiment

Next, a third embodiment of the present disclosure will be explained with reference to FIGS. 18 and 19. An example of a feature space according to the present embodiment is shown in FIG. 18.

Figure 18:
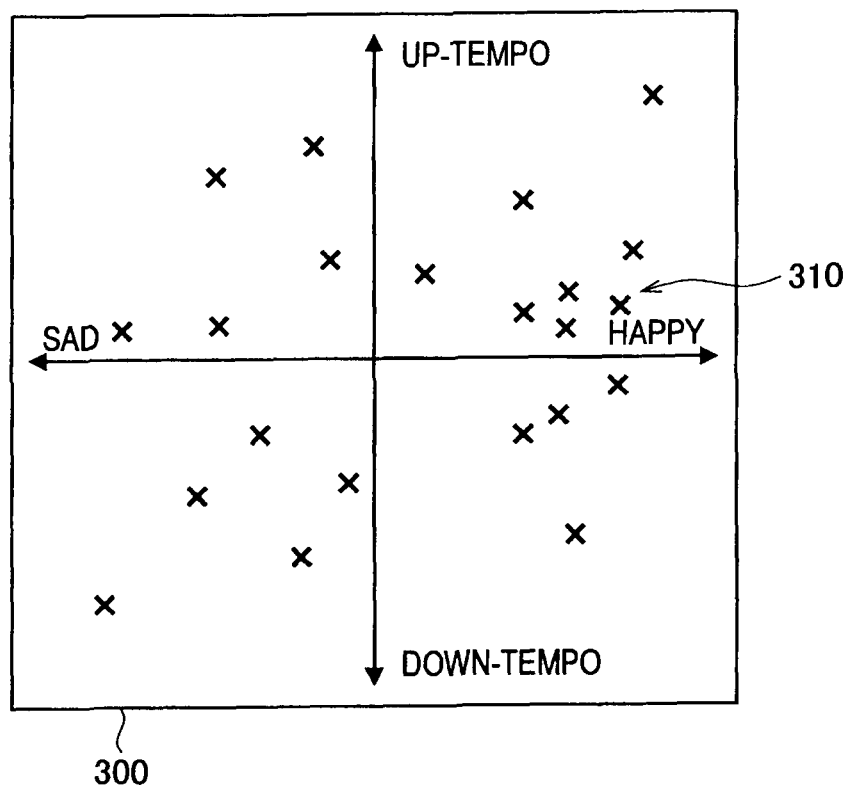
FIG. 18 is a figure that shows an example of a feature map space in a third embodiment of the present disclosure.

In FIG. 18, a feature map space 300 is shown in which music content 310 items are distributed. The music content 310 is content that includes audio data for music. Information on characteristics of the music, such as tempo, atmosphere, and the like, for example, is appended as meta-information to the music content 310. In the example that is shown in FIG. 18, a coordinate axis for parameters "happy" and "sad" that describe the atmosphere of the music and a coordinate axis for parameters "up-tempo" and "down-tempo" that describe the tempo of the music are defined in the feature map space 300, and the music content 310 items are positioned in the feature map space 300 according to the information on those characteristics.

Here, the feature map space 300 is a two-dimensional feature space. Furthermore, the music content 310 items are data that are described by their positions in the feature space. The display of the music content 310 items using this sort of feature map space 300 is used as an interface for the user to search the music content 310 items, for example.

Figure 19:
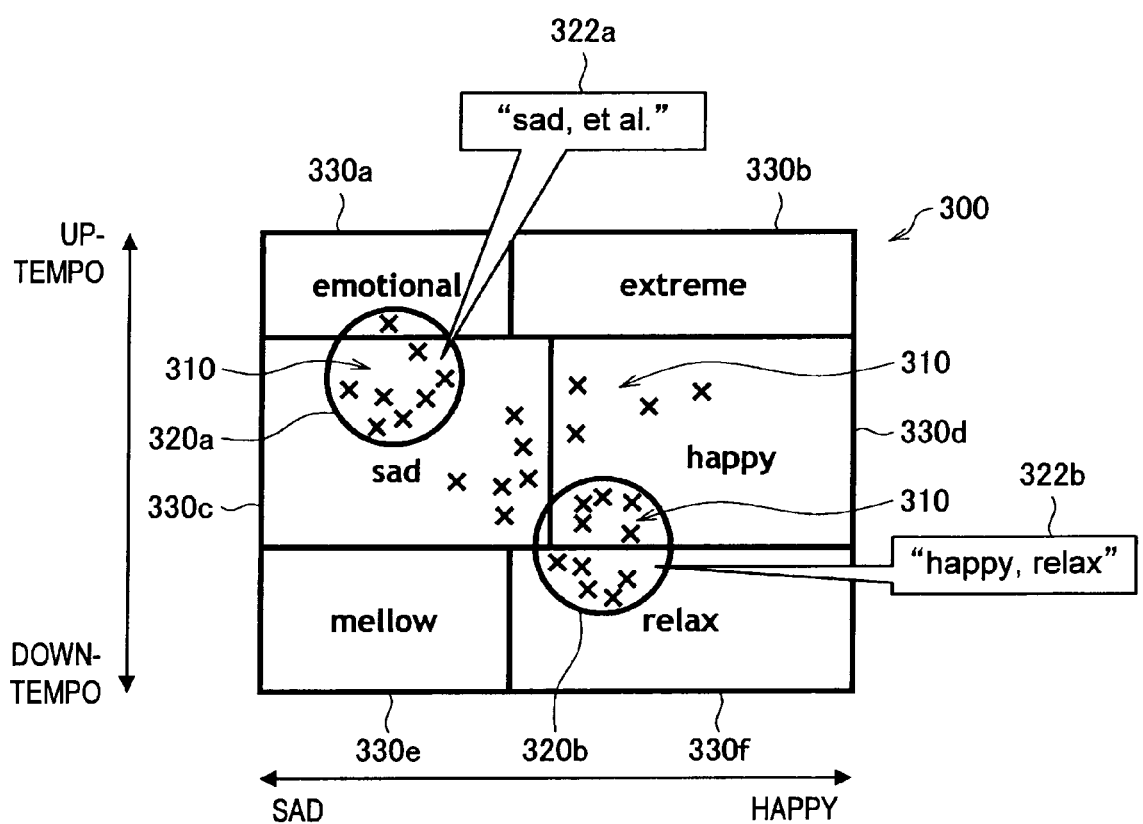
FIG. 19 is a figure that shows an example of the cluster name generation according to the third embodiment of the present disclosure.

An example of the cluster name generation according to the present embodiment is shown in FIG. 19. The music content 310 items in the feature map space 300 are grouped into clusters 320. Category districts 330 that are named districts are also defined in the feature map space 300 in advance, and cluster names 322 are assigned to the clusters 320 using the names of the category districts 330.

In the present embodiment, the cluster name generation processing is performed by replacing the geographical districts in the first embodiment that is described above with virtual districts called feature map spaces. To be specific, first, the candidate district identification portion 15 of the information processing device 10 generates the primary list 140 of the candidate districts based on the category districts 330. In the primary list 140, at least one category district 330 is identified for each of the music content 310 items that are grouped into the cluster 320. The ranges and the names for the category districts 330 are acquired from the district name database 21.

Next, for each of the category districts 330 that are included in the primary list 140, the relatedness assessment portion 17 computes the assessment value for its relatedness to the cluster 320. The relatedness assessment value can be computed based on the number of the music content 310 items that are included in the category district 330, and on the size of any overlap between the district of the category district 330 and the district of the cluster 320. The relatedness assessment portion 17 takes the category district 330 that has the highest relatedness assessment value in the primary list 140 and adds it to the secondary list 150, along with information on its relatedness assessment value. The relatedness assessment portion 17 then deletes the information on that category district 330 from the primary list 140 and repeats the processing until the primary list 140 is empty.

Next, for each of the category districts 330 that are included in the secondary list 150, the cluster name generation portion 19 adds the name of the category district 330 to the cluster name 322, in descending order by the relatedness assessment value. The threshold value T1 for the number of the names that can be included in the cluster name 322 and the threshold value T2 for the sum of the relatedness assessment values for the category districts 330 whose names are included in the cluster name 322 can also be set in the present embodiment. The cluster name generation portion 19 repeats the adding of the names of the category districts 330 to the cluster name 322 until the threshold value T1 is reached for the number of the names that are included in the cluster name 322, until the threshold value T2 is reached for the sum of the relatedness assessment values, or until the secondary list 150 is empty.

Note that the details of the cluster name generation processing that is described above are the same as in the first embodiment, so a detailed explanation will be omitted. The clustering of the music content items according to the characteristics of the music is described in Japanese Patent Application Publication No. JP-A 2008-250857, for example. The method that is described in Japanese Patent Application Publication No. JP-A 2008-250857 can also be used as desired for the clustering in the present embodiment, so a detailed explanation of the clustering processing will also be omitted.

In the example that is shown in FIG. 19, tempo and mood are used to separated districts and a category district 330a called "emotional", for which the tempo is close to "up-tempo" and the atmosphere is close to "sad", a category district 330b called "extreme", for which the tempo is close to "up-tempo" and the atmosphere is close to "happy", a category district 330c called "sad", for which the tempo is moderate and the atmosphere is close to "sad", a category district 330d called "happy", for which the tempo is moderate and the atmosphere is close to "happy", a category district 330e called "mellow", for which the tempo is close to "down-tempo" and the atmosphere is close to "sad", and a category district 330f called "relax", for which the tempo is close to "down-tempo" and the atmosphere is close to "happy", are defined as the category districts 330.

In the present embodiment, these category districts 330 are defined without any overlapping among them. In this sort of case, the number of the music content 310 items whose positions are included in the individual category districts 330 and the areas of overlap between the individual category districts 330 and the districts of the clusters 320 each exhibit the same sort of trend. In other words, the greater the number of the music content 310 items in the category district 330 becomes, the greater the area of overlap becomes with the district of the cluster 320, and the inverse also holds true. Therefore, in the present embodiment, the relatedness between the category district 330 and the cluster 320 may be assessed based on either one of the two criteria that were previously described.

Hereinafter, the cluster name generation processing in the present embodiment will be explained by explaining the generation of the cluster names 322 for the individual clusters 320 in concrete terms.

Cluster Name Generation Example 1

First, a cluster 320a will be explained as an example. The cluster 320a includes seven music content 310 items that are included in the "sad" category district 330c and one music content 310 item that is included in the "emotional" category district 330a. In this case, the candidate district identification portion 15 identifies the "sad" category district 330c and the "emotional" category district 330a in the primary list 140.

Here, of the category districts 330 that have been identified in the primary list 140, the "sad" category district 330c includes a comparatively large number of the music content 310 items, and its ratio of its overlapping district with the cluster 320a is large, so it is given a higher relatedness assessment value. In contrast, the "emotional" category district 330a includes few of the music content 310 items, and the ratio of its overlapping district with the cluster 320a is small, so it is given a lower relatedness assessment value.

Therefore, in the processing by the relatedness assessment portion 17, the category district 330c is added to the secondary list 150 first. The category district 330a is added to the secondary list 150 next, because it includes one of the music content 310 items that is not included in the category district 330c. However, the "sad" category district 330c encompasses almost all of the music content 310 items that are included in the cluster 320a, so its relatedness assessment value becomes a fairly high value. Therefore, in a case where the relatedness assessment value for the "sad" category district 330c reaches the threshold value T2 all by itself, for example, the "emotional" category district 330a is not used in the generating of the cluster name 322a, and "et al." is added instead. Thus, in the example that is shown in FIG. 19, the cluster name 322a becomes "sad, et al.".

Cluster Name Generation Example 2

Next, a cluster 320b will be explained as an example. The cluster 320b includes five music content 310 items that are included in the "happy" category district 330d and five music content 310 items that are included in the "relax" category district 330f. In this case, the candidate district identification portion 15 identifies the "happy" category district 330d and the "relax" category district 330f in the primary list 140. Each of these category districts 330 includes the same number of the music content 310 items and have the approximately same relatedness assessment values, but the ratio of the overlapping district with the cluster 320b is greater for the category district 330d, so it is given a higher relatedness assessment value. Therefore, the relatedness assessment portion 17 adds the category district 330d to the secondary list 150 first, and then adds the category district 330f. Thus, a cluster name 322b becomes "happy, relax".

4. Fourth Embodiment

A fourth embodiment of the present disclosure will be explained with reference to FIG. 20. Each of the first to the third embodiments that are described above is an embodiment that pertains to the information processing device 10, which acquires the cluster information and generates cluster name information, but the present embodiment pertains to an information processing device 30 that acquires information on the cluster name that has been generated.

Figure 20:
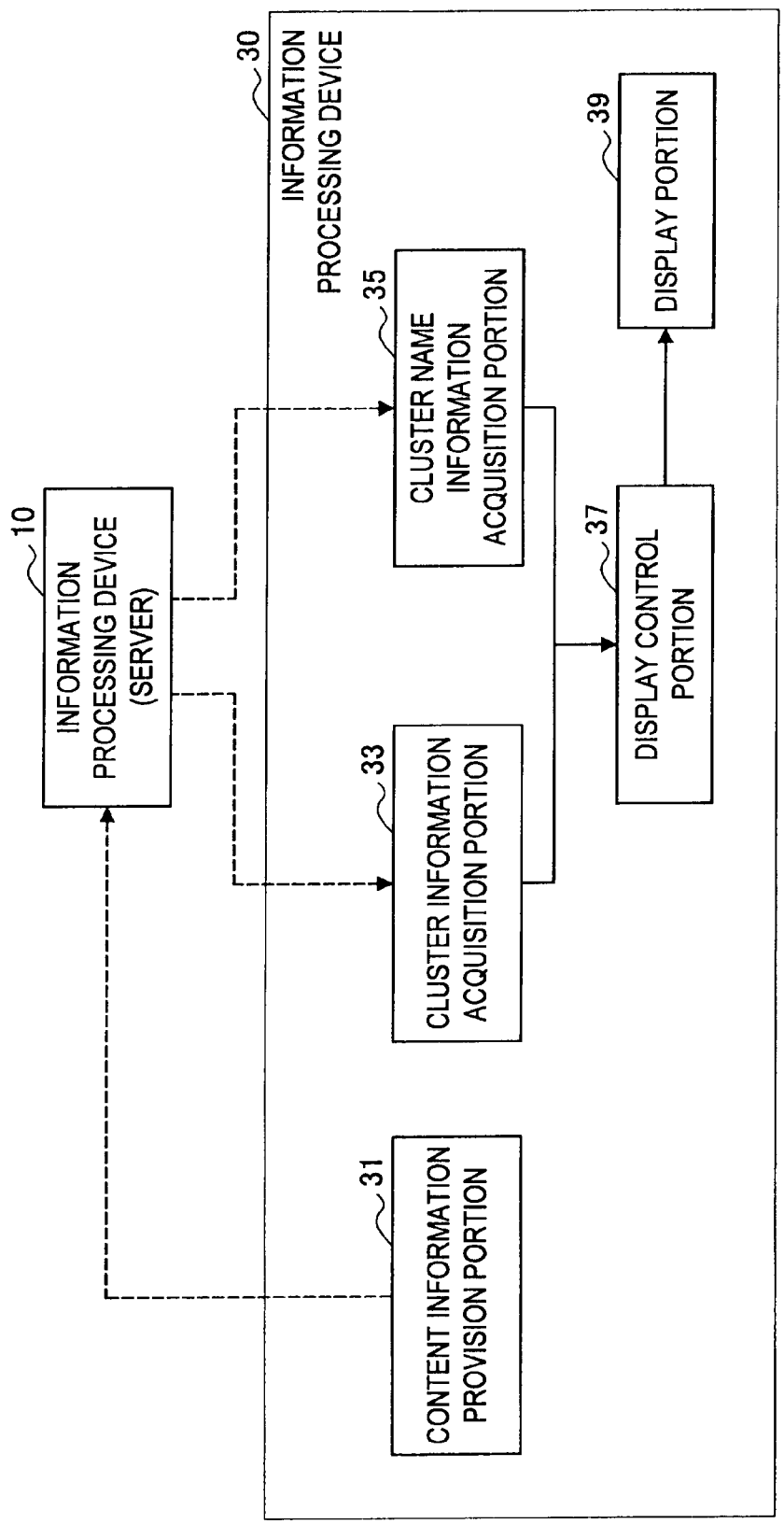
FIG. 20 is a block diagram that schematically shows a functional configuration of an information processing device according to a fourth embodiment of the present disclosure.

A block diagram in FIG. 20 schematically shows a functional configuration of the information processing device 30 according to the fourth embodiment of the present disclosure. The information processing device 30 may be implemented as a digital camera, a mobile telephone, or the like, for example, and it includes a content information provision portion 31, a cluster information acquisition portion 33, a cluster name information acquisition portion 35, a display control portion 37, and a display portion 39. The information processing device 30 can be an information processing device that is used as a client and that communicates with the information processing device 10, which can be used as a server, for example.

The content information provision portion 31 provides content information to the server. The content may be image content, music content, or the like, for example. The image content may be content that has been captured by an image capture portion that the information processing device 30 has, for example, and it may also be content that has been captured by another device and provided to the information processing device 30. The music content may be content that has been acquired from a removable storage medium using a drive that the information processing device 30 has, and it may also be content that has been downloaded from a network such as the Internet or the like. The content information provision portion 31 can be implemented by a communication device or the like for providing information on the content to the server. In the information that is provided to the server by the content information provision portion 31, position information for the content is appended as meta-information. As in the examples in the other embodiments, the position information for the content can be an image capture position or image capture date and time for the image content, for example, and can be characteristic information for the music content.

The cluster information acquisition portion 33 acquires information on clusters into which the server has grouped the content based on the information on the content that the content information provision portion 31 has provided to the server. As in the examples in the other embodiments, the clusters can be districts on a map, time periods on a time axis, districts in a feature map space, or the like, for example. The cluster information acquisition portion 33 acquires, from the server, information that defines the ranges of the clusters and information on the content that has been grouped into the clusters, then provides that information to the display control portion 37. The cluster information acquisition portion 33 can be implemented by a communication device or the like, for example, that acquires the information on the clusters from the server.

The cluster name information acquisition portion 35 acquires information on cluster names that corresponds to the information on the clusters that has been acquired by the cluster information acquisition portion 33. The cluster names can be generated by the server in the same manner as in the examples in the other embodiments. In other words, the cluster names can be generated based on the names of named districts that have been selected based on the relatedness between the clusters and the named districts in the feature space. The cluster name information acquisition portion 35 acquires the information on the cluster names from the server and provides it to the display control portion 37. The cluster name information acquisition portion 35 can be implemented by a communication device or the like, for example, that acquires the information on the cluster names from the server.

The display control portion 37 acquires the information on the clusters from the cluster information acquisition portion 33, acquires the information on the cluster names from the cluster name information acquisition portion 35, and displays the acquired information on the display portion 39. The display control portion 37 can be implemented by a CPU, a ROM, a RAM, and the like, for example, and the display portion 39 can be implemented by a display such as a liquid crystal display (LCD) or the like, for example.

As described above, in a case where the information processing device 10 in the first to the third embodiments is a server, for example, the information processing device 30 can be implemented as a device that functions as a client in relation to the server. In other words, the information processing device 30 can be a device that communicates with the information processing device 10 and displays the cluster names that have been generated by the information processing device 10 on the display portion 39, together with the clusters.

The information processing device 30 can also be implemented as the same device as the information processing device 10 in the first to the third embodiments that are described above, for example. In other words, the information processing device 30 can also be a device that displays the cluster names that it has generated on its own on the display portion 39, together with the clusters.

The information processing device 30 can thus be implemented in the form of various types of devices. Therefore, the information processing device 30, in addition to being a digital camera or a mobile telephone, can also be any type of information processing device, such as a PC, a video camera, a game device, a smart phone, a car navigation system, a PDA, or the like.

In each of these cases, the clusters and the cluster names are displayed on the display portion 39 of the information processing device 30, as shown in FIGS. 2, 17, 19, and the like, for example.

5. Hardware Configuration

Next, a hardware configuration of an information processing device 10 according to the embodiments described above will be described in detail with reference to FIG. 21. Note that information processing device 30 may be realized by the similar hardware configuration.

FIG. 21 is a block diagram for describing a hardware configuration of the information processing device 10 according to the embodiment.

The information processing device 10 includes a CPU 901, a ROM 903, and a RAM 905. Furthermore, the information processing device 10 may also include a host bus 907, a bridge 909, and external bus 911, an interface 913, an input device 915, an output device 917, a storage device 919, a drive 921, a connection port 923, and a communication device 925.

The CPU 901 functions as a processing device and a control device, and controls the overall operation or a part of the operation of the information processing device 10 according to various programs recorded in the ROM 903, the RAM 905, the storage device 919 or a removable recording medium 927. The ROM 903 stores programs to be used by the CPU 901, processing parameters and the like. The RAM 905 temporarily stores programs to be used in the execution of the CPU 901, parameters that vary in the execution, and the like. The CPU 901, the ROM 903 and the RAM 905 are connected to one another through the host bus 907 configured by an internal bus such as a CPU bus.

The host bus 907 is connected to the external bus 911 such as a PCI (Peripheral Component Interconnect/Interface) bus via the bridge 909.

The input device 915 is input means to be operated by a user, such as a mouse, a keyboard, a touch panel, a button, a switch, a lever or the like. Further, the input device 915 may be remote control means that uses an infrared or another radio wave, or it may be an externally connected appliance 929 such as a mobile phone, a PDA or the like conforming to the operation of the information processing device 10. Furthermore, the input device 915 is configured from an input control circuit or the like for generating an input signal based on information input by a user with the operation means described above and outputting the signal to the CPU 901. A user of the information processing device 10 can input various kinds of data to the information processing device 10 or instruct the information processing device 10 to perform processing, by operating the input device 915.

The output device 917 is configured from a device that is capable of visually or auditorily notifying a user of acquired information. Examples of such device include a display device such as a CRT display device, a liquid crystal display device, a plasma display device, an EL display device or a lamp, an audio output device such as a speaker or a headphone, a printer, a mobile phone, a facsimile and the like. The output device 917 outputs results obtained by various processes performed by the information processing device 10, for example. To be specific, the display device displays, in the form of text or image, results obtained by various processes performed by the information processing device 10. On the other hand, the audio output device converts an audio signal such as reproduced audio data or acoustic data into an analogue signal, and outputs the analogue signal.

The storage device 919 is a device for storing data configured as an example of a storage unit of the information processing device 10. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various types of data, and various types of data obtained from the outside, for example.

The drive 921 is a reader/writer for a recording medium, and is incorporated in or attached externally to the information processing device 10. The drive 921 reads information recorded in the attached removable recording medium 927 such as a magnetic disk, an optical disk, a magneto-optical disk, or a semiconductor memory, and outputs the information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray (registered trademark) medium. The removable recording medium 927 may be a CompactFlash (CF; registered trademark), a flash memory, an SD memory card (Secure Digital Memory Card), or the like. Alternatively, the removable recording medium 927 may be, for example, an electronic appliance or an IC card (Integrated Circuit Card) equipped with a non-contact IC chip.

The connection port 923 is a port for allowing devices to directly connect to the information processing device 10. Examples of the connection port 923 include a USB (Universal Serial Bus) port, an IEEE 1394 port, a SCSI (Small Computer System Interface) port, and the like. Other examples of the connection port 923 include an RS-232C port, an optical audio terminal, an HDMI (High-Definition Multimedia Interface) port, and the like. With the externally connected appliance 929 connected to this connection port 923, the information processing device 10 directly obtains various types of data from the externally connected appliance 929, and provides various types of data to the externally connected appliance 929.

The communication device 925 is a communication interface configured from, for example, a communication device for connecting to a communication network 931. The communication device 925 is, for example, a wired or wireless LAN (Local Area Network), a Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol, such as TCP/IP, on the Internet and with other communication devices, for example. The communication network 931 connected to the communication device 925 is configured from a network or the like connected via wire or wirelessly, and may be, for example, the Internet, a home LAN, infrared communication, radio wave communication, satellite communication or the like.

Heretofore, an example of the hardware configuration of the information processing device 10 has been shown. Each of the structural elements described above may be configured using a general-purpose material, or may be configured from hardware dedicated to the function of each structural element. Accordingly, the hardware configuration to be used can be changed as appropriate according to the technical level at the time of carrying out each of the embodiments described above.

6. Supplement

Thus an appropriate cluster name is generated from the names of the predetermined named districts, based on the degrees of relatedness between the cluster and the individual named districts. The identifying by the candidate district identification portion of at least one candidate district for each one of the position data items that have been grouped into the cluster makes it possible to identify, as a candidate district, even a named district that includes only some of the position data items that have been grouped into the cluster. Therefore, an appropriate name can be generated even for a comparatively small cluster that covers a plurality of the named districts, for example.

The relatedness assessment portion may assess the relatedness based on at least a ratio of a portion of the cluster that overlaps with each of the at least one named district.

Thus, preventing a named district that is too large in comparison to the size of the cluster, for example, from being used in the generation of the cluster name, and using the name of a named district of a size that is approximately the same as the size of the cluster, makes it possible to assign a natural cluster name of a size that corresponds to the size of the cluster.

The candidate district identification portion may identify a first named district and a second named district, and the relatedness assessment portion, in a case where the relatedness for the first named district is greater than the relatedness for the second named district, may remove the portion of the cluster that overlaps with the first named district from the portion of the cluster that overlaps with the second named district, and may assess the relatedness for the second named district again.

Thus, in the assessment of the relatedness of each of the named districts, a portion of the cluster that includes another named district with a higher degree of relatedness is excluded. Therefore, between named districts that largely overlap or that are in a relationship where one encompasses the other, the named district with the higher degree of relatedness to the cluster can be identified and used for the cluster name.

The relatedness assessment portion may assess the relatedness based on at least the number of the position data items that are included in each of the at least one named district.

Thus, preventing a named district that is too small in comparison to the size of the cluster, for example, from being used in the generation of the cluster name, and using the name of a named district of a size that is approximately the same as the size of the cluster, makes it possible to assign a natural cluster name of a size that corresponds to the size of the cluster.

The candidate district identification portion may identify a first named district and a second named district, and the relatedness assessment portion, in a case where the relatedness for the first named district is greater than the relatedness for the second named district, may remove the position data items that are included in the first named district from the position data items that are included in the second named district, and may assess the relatedness for the second named district again.

Thus, the position data items that are included in the named district that was assessed as having the highest degree of relatedness at a certain point in time are not taken into account in subsequent assessments of relatedness. Therefore, in the subsequent assessments of relatedness, the relatedness of a named district that has other position data items is assessed as being relatively high.

The candidate district identification portion may identify a plurality of the named districts, and the cluster name generation portion may generate the name for the cluster by jointly using the names of the named districts in descending order of their relatedness.

Thus, the district for a cluster can be described with precision by using names jointly, even in a case where it is difficult to describe the district for a cluster with a single name.

The relatedness assessment portion may compute an assessment value for the relatedness for each of the plurality of the named districts, and the cluster name generation portion may generate the name for the cluster by jointly using the names of the named districts until the sum of the assessment values for the named districts that are used reaches a first threshold value.

Thus, it is possible to maintain an appropriate length for the cluster name and to ensure its readability during display by preventing the names of named districts that have little relatedness to the cluster, but not zero relatedness, for example, from being added to the cluster name without any limit.

The cluster name generation portion may generate the name for the cluster by jointly using the names of the named districts until the number of the names that are used reaches a second threshold value.

Thus, the length of the cluster name can be restricted to a specified range, and the name's readability during display can be ensured.

The cluster name generation portion may generate the name for the cluster by giving priority, among named districts that are in a hierarchical relationship, to using the name of a lower ranking named district.

It is thus possible to prevent the names of districts that are in a hierarchical relationship from being used jointly in the cluster name and impressing the user as unnatural.

The cluster name generation portion, in a case where, among the at least one named district that has been identified, a named district exists whose name is not used in the name for the cluster, may append language that means "et al." to the name for the cluster.

Thus, even in a case where the name of a district that corresponds to all of the position data items is not included in the cluster name for some reason, it is possible to indicate that position data items other than what is expressed by the cluster name are included in the cluster.

In the explanation of the embodiments that are described above, examples were shown of a two-dimensional feature space (the map, the feature map space) and a one-dimensional feature space (the time axis), but the present disclosure is not limited to these examples. The present disclosure can be applied in any case, provided that positions in a feature space, a cluster into which the positions are grouped, and a specified district in the feature space exist. That is, the present disclosure can be applied in the same manner as in the examples described above, even in a feature space with any number of dimensions, including three or more.

It should be understood by those skilled in the art that various modifications, combinations, sub-combinations and alterations may occur depending on design requirements and other factors insofar as they are within the scope of the appended claims or the equivalents thereof.

According to one embodiment, an information processing device includes a candidate attribute area identification portion configured to receive information associated with a cluster of at least one data item, and identify at least one named attribute area for each of the at least one data item;

a relatedness assessment portion configured to perform a relatedness assessment between the cluster and each of the at least one named attribute area; and a cluster name generation portion configured to generate a cluster name based on the relatedness assessment, wherein said cluster name includes at least a part of one of the at least one named attribute area.

According to one aspect,
the attribute area is a geographic attribute area.
According to another aspect,
the attribute area is a temporal attribute area.

According to another aspect,
the attribute area is a music content attribute area.

According to another aspect,
the candidate attribute area identification portion identifies a primary list of candidate attribute areas, and
the relatedness assessment portion generates a secondary list of candidate attribute areas as the relatedness assessment based on the primary list provided by the candidate attribute area identification portion, and
the cluster name generation portion generates the name based on the secondary list.

According to another aspect,
the relatedness assessment portion determines the relatedness assessment according to $E=n \times D/S$, where E is the relatedness assessment, n is a number of data items, D is an area overlap between attribute areas, and S is an area of a candidate attribute area.

According to another aspect,
the cluster name generation portion is configured to compare the relatedness assessment for a first candidate attribute area to a first predetermined value and if above said first predetermined value, including at least a portion of a name of the first candidate attribute area in the cluster name.

According to another aspect,
the cluster name generation portion is configured to compare the relatedness assessment for another candidate attribute area to a second predetermined value and if above said second predetermined value, including at least a portion of a name of the second candidate attribute area in the cluster name.

According to another aspect,
the at least another data item includes a plurality of images having an associated image capture date and time as part of the primary list of candidate attribute areas,
the secondary list includes an event period that includes an image capture date and time for the at least one data item, and
the cluster name generation portion includes in the name at least a part of a name of the event period.

According to another aspect,
the at least one data item includes a plurality of music content with associated tempo and mood as part of the primary list of candidate attribute areas,
the secondary list includes a particular mood and tempo district in which the at least one data item is related, and
the cluster name generation portion generates includes at least a part of the particular mood and tempo district in the name.

According to another aspect,
said candidate attribute area identification portion receives information associated with the cluster from a content acquisition portion, said content acquisition portion being remotely located and communicates with the candidate attribute area identification portion via at least one of a wireless link and an Internet link.

According to another aspect,
said candidate attribute area identification portion receives information associated with the cluster directly from a content acquisition portion that is in a common enclosure with said candidate attribute area identification portion.

According to an information processing method embodiment, the method includes
receiving information associated with a cluster of at least one data item, and identifying at least one named attribute area for each of the at least one data item;
assessing with a processing circuit a relatedness assessment between the cluster and each of the at least one named attribute area; and
generating a cluster name based on the relatedness assessment, wherein said cluster name includes at least a part of one of the at least one named attribute area.

According to one aspect of the method,
the attribute area is a geographic attribute area.

According to another aspect,
the attribute area is a temporal attribute area.

According to another aspect,
the attribute area is a music content attribute area.

According to another aspect,
the identifying includes identifying a primary list of candidate attribute areas, and
the assessing includes generating a secondary list of candidate attribute areas as the relatedness assessment based on the primary list provided by the identifying, and
the generating includes generating the name based on the secondary list.

According to another aspect,
the assessing includes determining the relatedness assessment according to $E=n \times D/S$, where E is the relatedness assessment, n is a number of data items, D is an area overlap between attribute areas, and S is an area of a candidate attribute area.

According to another aspect,
the generating includes comparing the assessed relatedness for a first candidate attribute area to a first predetermined value, and if above said first predetermined value, including at least a portion of a name of the first candidate attribute area in the cluster name.

According to a non-transitory computer readable medium embodiment, the medium includes computer readable instructions that when executed by a processing circuit perform an information processing method, the method includes
receiving information associated with a cluster including at least one data item, and identifying at least one named attribute area for each of the at least one data item;
assessing with a processing circuit a relatedness assessment between the cluster and each of the at least one named attribute area; and
generating a cluster name based on the relatedness assessment, wherein said cluster name includes at least a part of one of the at least one named attribute area.

Additionally, the present technology may also be configured as below.

(1)
An information processing device comprising:
a candidate attribute area identification portion configured to receive information associated with a cluster of at least one data item, and identify at least one named attribute area for each of the at least one data item;
a relatedness assessment portion configured to perform a relatedness assessment between the cluster and each of the at least one named attribute area; and
a cluster name generation portion configured to generate a cluster name based on the relatedness assessment, wherein said cluster name includes at least a part of one of the at least one named attribute area.

(2)
The information processing device of (1), wherein
the attribute area is a geographic attribute area.

(3)
The information processing device of (1) or (2), wherein
the attribute area is a temporal attribute area.
(4)
The information processing device of any one of (1) to (3), wherein
the attribute area is a music content attribute area.
(5)
The information processing device of any one of (1) to (4), wherein
the candidate attribute area identification portion identifies a primary list of candidate attribute areas, and
the relatedness assessment portion generates a secondary list of candidate attribute areas as the relatedness assessment based on the primary list provided by the candidate attribute area identification portion, and
the cluster name generation portion generates the name based on the secondary list.
(6)
The information processing device of any one of (1) to (5), wherein
the relatedness assessment portion determines the relatedness assessment according to $$E = n \times D/S, \text{ where}$$

E is the relatedness assessment, n is a number of data items, D is an area overlap between attribute areas, and S is an area of a candidate attribute area.
(7)
The information processing device of any one of (1) to (6), wherein
the cluster name generation portion is configured to compare the relatedness assessment for a first candidate attribute area to a first predetermined value and if above said first predetermined value, including at least a portion of a name of the first candidate attribute area in the cluster name.
(8)
The information processing device of (7), wherein
the cluster name generation portion is configured to compare the relatedness assessment for another candidate attribute area to a second predetermined value and if above said second predetermined value, including at least a portion of a name of the second candidate attribute area in the cluster name.
(9)
The information processing device of (5), wherein
the at least one data item includes a plurality of images having an associated image capture date and time as part of the primary list of candidate attribute areas,
the secondary list includes an event period that includes an image capture date and time for the at least one data item, and
the cluster name generation portion includes in the name at least a part of a name of the event period.
(10)
The information processing device of (5) or (9), wherein
the at least one data item includes a plurality of music content with associated tempo and mood as part of the primary list of candidate attribute areas,
the secondary list includes a particular mood and tempo district in which the at least one data item is related, and
the cluster name generation portion generates includes at least a part of the particular mood and tempo district in the name.
(11)
The information processing device of any one of (1) to (10), wherein
said candidate attribute area identification portion receives information associated with the cluster from a content acquisition portion, said content acquisition portion being remotely located and communicates with the candidate attribute area identification portion via at least one of a wireless link and an Internet link.
(12)
The information processing device of any one of (1) to (11), wherein
said candidate attribute area identification portion receives information associated with the cluster directly from a content acquisition portion that is in a common enclosure with said candidate attribute area identification portion.

The present disclosure contains subject matter related to that disclosed in Japanese Priority Patent Application JP 2011-128359 filed in the Japan Patent Office on Jun. 8, 2011, the entire content of which is hereby incorporated by reference.

What is claimed is:

1. An information processing device comprising:
a CPU configured to implement
a candidate attribute area identification portion configured to receive information associated with a cluster of at least one data item, and identify at least one named attribute area for each of the at least one data item;
a relatedness assessment portion configured to perform a relatedness assessment between the cluster and each of the at least one named attribute area; and
a cluster name generation portion configured to generate a cluster name based on the relatedness assessment, wherein said cluster name includes at least a part of one of the at least one named attribute area, and the relatedness assessment portion determines the relatedness assessment according to $$E = n \times D/S, \text{ where}$$

E is the relatedness assessment, n is a number of data items, D is an area overlap between attribute areas, and S is an area of a candidate attribute area,
wherein the attribute area is at least one of a geographic attribute area, a temporal attribute area, and a music content attribute area.

2. The information processing device of claim 1, wherein the candidate attribute area identification portion identifies a primary list of candidate attribute areas, and
the relatedness assessment portion generates a secondary list of candidate attribute areas as the relatedness assessment based on the primary list provided by the candidate attribute area identification portion, and
the cluster name generation portion generates the name based on the secondary list.

3. The information processing device of claim 1, wherein the cluster name generation portion is configured to compare the relatedness assessment for a first candidate attribute area to a first predetermined value and if above said first predetermined value, including at least a portion of a name of the first candidate attribute area in the cluster name.

4. The information processing device of claim 3, wherein the cluster name generation portion is configured to compare the relatedness assessment for another candidate attribute area to a second predetermined value and if above said second predetermined value, including at least a portion of a name of the second candidate attribute area in the cluster name.

5. The information processing device of claim 2, wherein the at least one data item includes a plurality of images having an associated image capture date and time as part of the primary list of candidate attribute areas, the secondary list includes an event period that includes an image capture date and time for the at least one data item, and the cluster name generation portion includes in the name at least a part of a name of the event period.

6. The information processing device of claim 2, wherein the at least one data item includes a plurality of music content with associated tempo and mood as part of the primary list of candidate attribute areas, the secondary list includes a particular mood and tempo district in which the at least one data item is related, and the cluster name generation portion generates includes at least a part of the particular mood and tempo district in the name.

7. The information processing device of claim 1, wherein said candidate attribute area identification portion receives information associated with the cluster from a content acquisition portion, said content acquisition portion being remotely located and communicates with the candidate attribute area identification portion via at least one of a wireless link and an Internet link.

8. The information processing device of claim 1, wherein said candidate attribute area identification portion receives information associated with the cluster directly from a content acquisition portion that is in a common enclosure with said candidate attribute area identification portion.

9. An information processing method comprising:
receiving information associated with a cluster of at least one data item, and identifying at least one named attribute area for each of the at least one data item;

assessing with a processing circuit a relatedness assessment between the cluster and each of the at least one named attribute area; and generating a cluster name based on the relatedness assessment, wherein said cluster name includes at least a part of one of the at least one named attribute area, and the assessing includes determining the relatedness assessment according to $E = n \times D/S$, where E is the relatedness assessment, n is a number of data items, D is an area overlap between attribute areas, and S is an area of a candidate attribute area wherein the attribute area is at least one of a geographic attribute area, a temporal attribute area, and a music content attribute area.

10. The information processing method of claim 9, wherein
the identifying includes identifying a primary list of candidate attribute areas, and the assessing includes generating a secondary list of candidate attribute areas as the relatedness assessment based on the primary list provided by the identifying, and the generating includes generating the name based on the secondary list.

11. The information processing method of claim 9, wherein
the generating includes comparing the assessed relatedness for a first candidate attribute area to a first predetermined value, and if above said first predetermined value, including at least a portion of a name of the first candidate attribute area in the cluster name.

12. A non-transitory computer readable medium having computer readable instructions that when executed by a processing circuit perform an information processing method, the method comprising:
receiving information associated with a cluster including at least one data item, and identifying at least one named attribute area for each of the at least one data item;

assessing with a processing circuit a relatedness assessment between the cluster and each of the at least one named attribute area; and generating a cluster name based on the relatedness assessment, wherein said cluster name includes at least a part of one of the at least one named attribute area, and the assessing includes determining the relatedness assessment according to $E = n \times D/S$, where E is the relatedness assessment, n is a number of data items, D is an area overlap between attribute areas, and S is an area of a candidate attribute area, wherein the attribute area is at least one of a geographic attribute area, a temporal attribute area, and a music content attribute area.

* * * * *